(12) United States Patent
Cho et al.

(10) Patent No.: US 7,626,575 B2
(45) Date of Patent: Dec. 1, 2009

(54) LIGHT PEN

(75) Inventors: Jong-Whan Cho, Gunpo-si (KR);
Sang-Jin Park, Yongin-si (KR);
Won-Sang Park, Yongin-si (KR);
Kee-Han Uh, Yongin-si (KR);
Hyung-Guel Kim, Yongin-si (KR);
Jae-Hoon Jung, Anyang-si (KR)

(73) Assignee: Samsung Electronics Co., Ltd. (KR)

( * ) Notice: Subject to any disclaimer, the term of this patent is extended or adjusted under 35 U.S.C. 154(b) by 703 days.

(21) Appl. No.: 10/805,961

(22) Filed: Mar. 22, 2004

(65) Prior Publication Data
US 2004/0189621 A1    Sep. 30, 2004

(30) Foreign Application Priority Data
Mar. 28, 2003   (KR) ...................... 10-2003-0019603
Apr. 17, 2003   (KR) ...................... 10-2003-0024382
Jun. 18, 2003   (KR) ...................... 10-2003-0039340

(51) Int. Cl.
*G09G 5/00* (2006.01)

(52) U.S. Cl. .................. 345/173; 345/180; 345/181; 345/182; 345/183

(58) Field of Classification Search ............... 345/179, 345/182, 183
See application file for complete search history.

(56) References Cited

U.S. PATENT DOCUMENTS 3,626,483 A * 12/1971 Whetstone et al. .......... 367/137
3,911,270 A * 10/1975 Traub .................... 250/227.13
4,345,248 A    8/1982 Togashi et al. ............... 340/784
4,454,417 A * 6/1984 May .......................... 250/216
5,166,568 A * 11/1992 Nystuen et al. ......... 310/216.111
5,166,668 A * 11/1992 Aoyagi ....................... 345/180
5,568,292 A   10/1996 Kim ............................ 359/67

(Continued)

FOREIGN PATENT DOCUMENTS

EP            0 109 832        5/1984

(Continued)

OTHER PUBLICATIONS

PCT International Search Report; International application No. PCT/KR2004/000639; International filing date: Mar. 24, 2004; Date of Mailing: Sep. 1, 2004.

*Primary Examiner*—Bipin Shalwala
*Assistant Examiner*—Afroza Y Chowdhury
(74) *Attorney, Agent, or Firm*—Cantor Colburn LLP

(57) ABSTRACT

A photo detective LCD device includes a light pen. The light pen includes a body, a driving pulse generating module and a light generating module. The body has a pen shape, and an end of the body includes an opening through which light exits. The driving pulse generating module is disposed in the body and generates first and second driving power pulses having first and second frequencies, respectively. The light generating module generates first and second light in response to the first and second driving power pulses, respectively. The first and second light flickers in a third frequency and a fourth frequency, respectively. The power consumption is reduced, and the brightness of sensing light is enhanced. The light pen generates light having at least two different frequencies, and the display device recognizes light generated from the light pen effectively. Therefore, the display device may operate without failure.

4 Claims, 24 Drawing Sheets

U.S. PATENT DOCUMENTS

| | | | |
|---|---|---|---|
| 5,751,453 A | 5/1998 | Baur | 359/60 |
| 6,377,249 B1* | 4/2002 | Mumford | 345/179 |
| 6,529,189 B1* | 3/2003 | Colgan et al. | 345/179 |
| 6,686,579 B2* | 2/2004 | Fagin et al. | 250/208.1 |
| 6,789,191 B1* | 9/2004 | Lapstun et al. | 713/168 |
| 7,006,080 B2* | 2/2006 | Gettemy | 345/175 |
| 2002/0021291 A1* | 2/2002 | Cook | 345/183 |
| 2003/0112220 A1* | 6/2003 | Yang et al. | 345/156 |
| 2003/0146906 A1* | 8/2003 | Lin | 345/179 |

FOREIGN PATENT DOCUMENTS

| | | |
|---|---|---|
| EP | 0 601 837 A2 | 6/1994 |
| JP | 2-50216 | 2/1990 |
| JP | 02-050216 A | 2/1990 |
| JP | 10-91343 | 4/1998 |
| JP | 10-091343 A | 4/1998 |
| JP | 10-283113 A | 10/1998 |

\* cited by examiner

FIG. 20
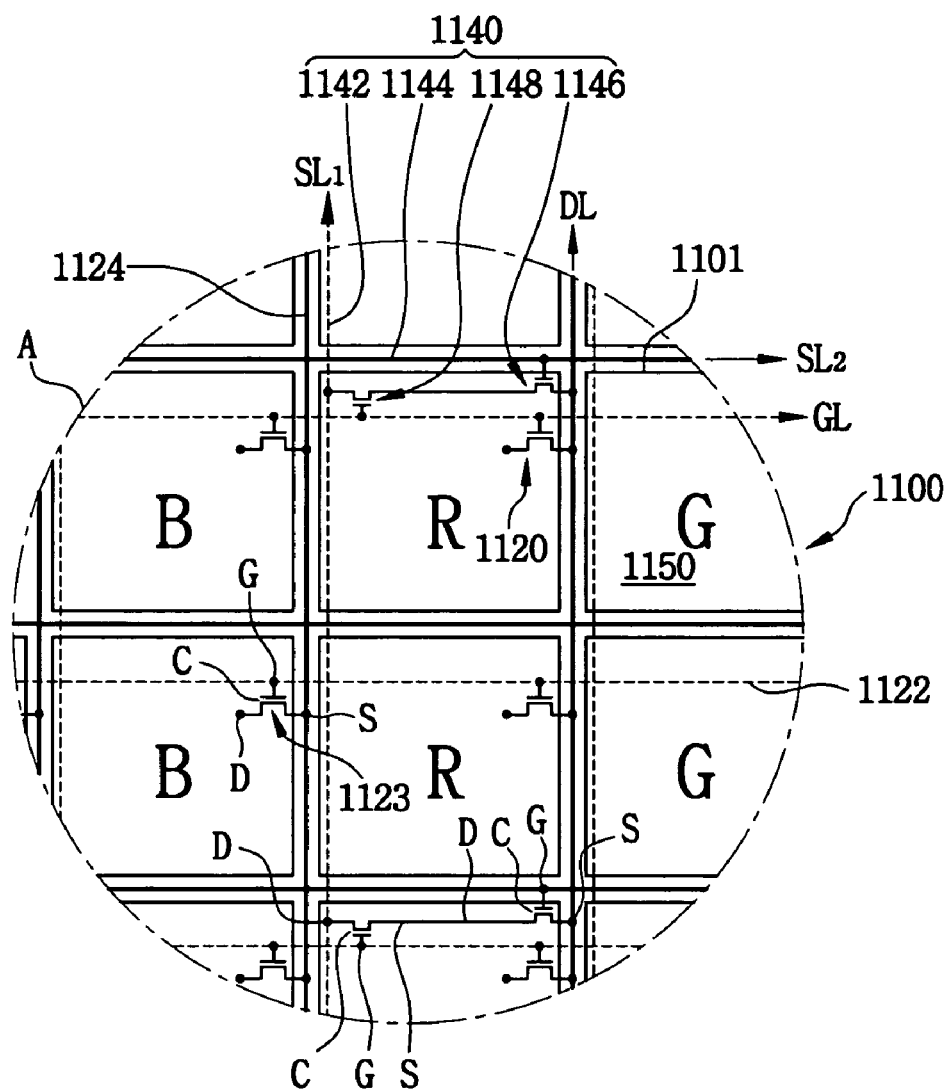
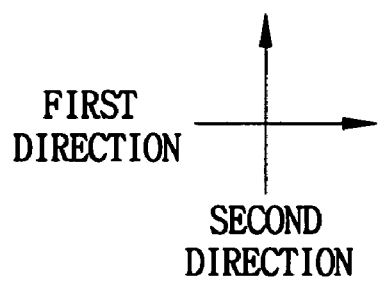

LIGHT PEN

CROSS-REFERENCE TO RELATED APPLICATIONS

This application relies for priority upon Korean Patent Application No. 2003-19603 filed on Mar. 28, 2003, Korean Patent Application No. 2003-24382 filed on Apr. 17, 2003, and Korean Patent Application No. 2003-39340 filed on Jun. 18, 2003, the contents of which are herein incorporated by reference in their entirety.

BACKGROUND OF THE INVENTION

1. Field of the Invention

The present invention relates to a light pen, a photo detective liquid crystal display device, and a display device having the light pen 2. Description of the Related Art Display devices may be divided into a cathode ray tube (CRT) type display device, an electroluminescent display device (ELD) and a liquid crystal display (LCD) device.

A first type display device receives video signals from an information-processing device and converts the video signals so as to display an image. The first type display device communicates with the information-processing device in a one-way fashion. A user inputs data into the information-processing device by means of input devices such as keyboard, keypad and mouse, etc.

A second type display device receives first video signals from an information processing device, converts the first video signals so as to display an image, and also outputs signals inputted onto the screen of the display device by the user to the information processing device. In other words, the second type display device communicates with the information-processing device in a two-way fashion.

The second type display device further includes a touch panel so as to perform the two-way communication. The touch panel detects the pressure generated by a hand of the user or a touch pen, and outputs position data to the information-processing device. The position data designates the position of the point to which the pressure are applied. A selected position is perceived via the touch panel. The information-processing device receives the position data, generates second video signals using the position data, and outputs second video signals to the second type display device.

However, the second type display device has an increased thickness and weight due to the touch panel so as to communicate with the information-processing device in the two-way fashion. The second type display device using the touch panel may not display minute images and characters.

A third type display device senses the light inputted from the user, communicates with the information processing device in the two-way fashion, and outputs minute images and characters to the information processing device. The third type display device has a plurality of photo sensors. The photo sensors have a minute size and are arranged in a matrix shape. The display device transforms the light detected by the photo sensors into a signal so that the information-processing device is able to perceive the signal corresponding to the light detected by the photo sensors, and outputs the signal to the information-processing device. The information-processing device outputs a new video signal to the display device in response to the signal received from the display device. The display device displays a new image in response to the new video signal.

The user applies the light to the photo sensors of the display device by means of a light pen. The conventional light pen generates the light only when the light pen applies more than a predetermined pressure to the surface of the display device so as to reduce power consumption of the light pen.

The conventional light pen consumes little power. However, the user should always apply more than a predetermined pressure to the surface of the display device by means of the conventional light pen. Therefore, the user may feel fatigued when the user presses the surface of the display device by means of the conventional light pen for a long time. In addition, the display device may be scratched and damaged by the light pen. In addition, the conventional light pen has lens and have a complicated configuration. Therefore, the cost for manufacturing the light pen may increase, and the weight and volume of the light pen may increase. Further, the photo sensors may mistake an external light for the light generated from the light pen, so that the display device may operate in the wrong way.

SUMMARY OF THE INVENTION

Accordingly, the present invention is provided for substantially obviate one or more problems due to limitations and disadvantages of the related art.

It is a first feature of the present invention to provide a light pen having a simple structure and a reduced weight. The light pen may be manufactured by a reduced cost. The light pen need not apply any pressure to the surface of the display device, and generates light when the light pen touches the surface of the display device. Therefore, the display device may operate without failure.

It is a second feature of the present invention to provide a photo detective liquid crystal display device having the light pen.

It is a third feature of the present invention to provide a photo detective display device having the light pen.

In at least one exemplary embodiment, a light pen includes a body, a photo detective module, a control module and a light generating module. The photo detective module is disposed in the body and detects a first light inputted from an external source to output a sensing signal. The control module outputs a control signal in response to the sensing signal. The light generating module receives a driving power signal in response to the control signal to generate a second light.

In at least one other exemplary embodiment, a light pen includes a body, a driving pulse generating module and a light generating module. The driving pulse generating module is disposed in the body, and generates a first driving power pulse having a first frequency during a first time period and a second driving power pulse having a second frequency during a second time period. The light generating module generates a first light in response to the first driving power pulse and a second light in response to the second driving power pulse, the first light flickers in a third frequency, and the second light flickers in a fourth frequency.

In another exemplary embodiment, a light pen includes a body having a first end and a second end and a light guiding unit. The light guiding unit is coupled to the second end of the body, and guides a first light generated from an external source toward the first end of the body.

In still another exemplary embodiment, a liquid crystal display device includes one of above mentioned light pens, a liquid crystal display panel and a driving module. The liquid crystal display panel includes a first substrate, a second substrate facing the first substrate, a liquid crystal layer interposed between the first substrate and the second substrate, a plurality of first electrodes disposed on the first substrate, a second electrode disposed on the second substrate, and a photo detective element. The photo detective element is disposed between the first electrodes, and detects the second light to output a second sensing signal having a position information. The position information has a position to which the second light is incident. The driving module generates first and second driving signals. The first driving signal is applied to the first and second electrodes so that the liquid crystal display panel outputs the first light, and the second driving signal is applied to the first and second electrodes in response to the second sensing signal so that the liquid crystal display panel outputs a third light.

In still another exemplary embodiment, a liquid crystal display device includes one of above mentioned light pens, a liquid crystal display panel, a sensed signal processing unit and a driving module. The liquid crystal display panel includes a plurality of pixels and a photo detective element. The pixels control a transmissivity of a third light passing through a liquid crystal layer to display an image. The photo detective element is disposed between the pixels, and detects a position into which the first and second lights are incident. The sensed signal processing unit includes a comparator module, and the comparator module compares a first intensity of a first sensing signal with a second intensity of a second sensing signal. The first sensing signal corresponds to a third light inputted from an external source, and the second sensing signal corresponds to the first and second lights. The driving module generates first and second driving signals, the first driving signal is applied to the pixels, and the second driving signal is applied to the pixels in response to the second sensing signal.

In still another exemplary embodiment, a liquid crystal display device includes a first substrate, a second substrate and a liquid crystal layer disposed between the fist and second substrates. The first substrate includes a first transparent substrate, a pixel voltage supplying part, a detective element, a color filter disposed in the pixel region, and a pixel electrode. The detective element is disposed in a second portion of the pixel region, detects an external signal to output a position signal, and the position signal has a position to which the external signal is applied. The color filter is disposed in the pixel region, and the pixel electrode is disposed on the color filter to receive the pixel voltage. The first transparent substrate has a pixel region, and the pixel voltage supplying part is disposed in a first portion of the pixel region, and outputs a pixel voltage. The second substrate includes a second transparent substrate facing the first transparent substrate, and a common electrode disposed on the second transparent substrate to face the pixel electrode.

In still another exemplary embodiment, a display device includes one of above mentioned light pens, a display unit and a driving module. The display unit includes a plurality of photo detective elements. The photo detective elements outputs the first light, detects the second light to output a second sensing signal having position information. The position information has a position to which the second light is incident. The driving module generates first and second driving signals. The first driving signal allows the display unit to output the first light, and the second driving signal allows the display unit to output a third light in response to the second sensing signal.

In still another exemplary embodiment, the display device includes one of above mentioned light pens, a display unit, a sensed signal processing unit and a driving module. The display unit includes a plurality of photo detective elements for detecting a position into which the first and second lights are incident. The sensed signal processing unit includes a comparator module, and the comparator module compares a first intensity of a first sensing signal with a second intensity of a second sensing signal. The first sensing signal corresponds to a third light inputted from an external source, and the second sensing signal corresponds to the first and second lights. The driving module generates first and second driving signals, the first driving signal allows the display unit to output a fourth light, and the second driving signal allows the display unit to output a fifth light in response to the second sensing signal.

BRIEF DESCRIPTION OF THE DRAWINGS

The above and other features and advantage points of the present invention will become more apparent by describing in detailed exemplary embodiments thereof with reference to the accompanying drawings, in which:

FIG. 20 is a partially enlarged view showing 'A' of FIG. 19;

DESCRIPTION OF EXEMPLARY EMBODIMENTS

Figure 1:
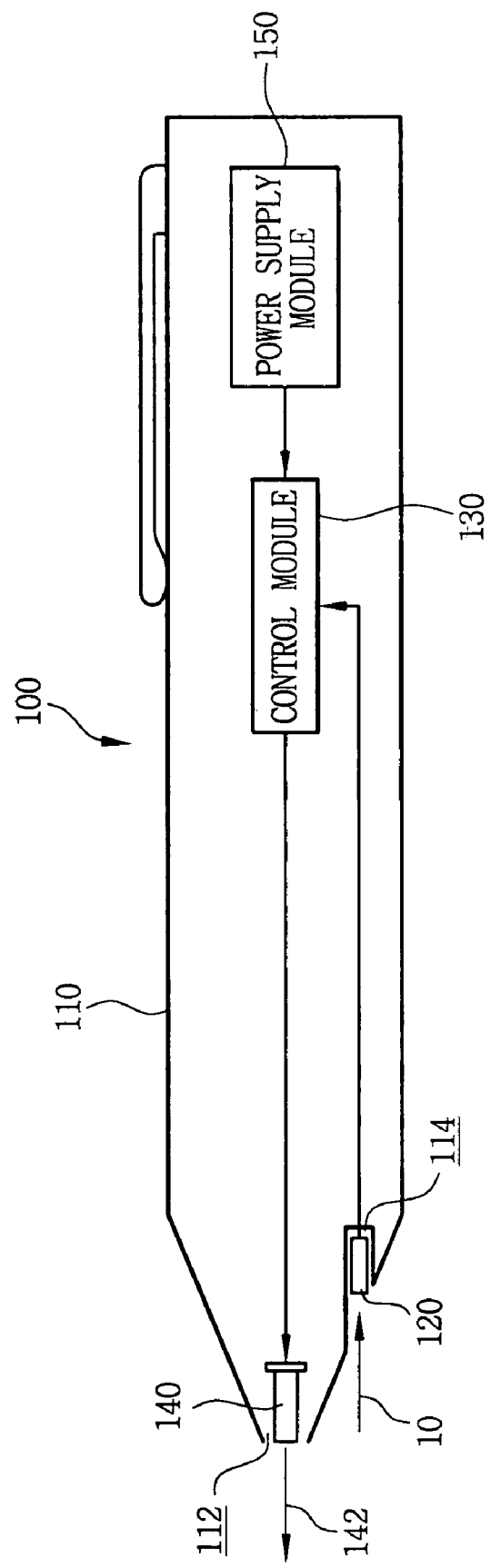
FIG. 1 is a schematic view showing a light pen according to a first exemplary embodiment of the present invention.

Detailed illustrative embodiments of the present invention are disclosed herein. However, specific structural and functional details disclosed herein are merely representative for purposes of describing exemplary embodiments of the present invention. This invention may, however, be embodied in many alternate forms and should not be construed as limited to the embodiments set forth herein.

Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention. Like numbers refer to like elements throughout the description of the figures.

Embodiment 1 of a Light Pen

FIG. 1 is a schematic view showing a light pen according to a first exemplary embodiment of the present invention.

Referring to FIG. 1, the light pen 100 includes a body 110, a photo detective module 120, a control module 130, a light generating module 140 and a power supply module 150.

The body 110 has a cylindrical shape and has an inner space so as to receive the photo detective module 120, the control module 130, the light generating module 140 and the power supply module 150. An opening 112 is formed at an end of the body 110, and the light generated from the light generating module 140 exits from the opening 112.

The photo detective module 120 is disposed in the body 110. The photo detective module 120 detects image light 10 inputted from an external source. The image light 10 is generated from a display device such as a liquid crystal display device. The photo detective module 120 is able to detect white light, monochromatic light and the image light, etc.

The photo detective module 120 outputs a sensing signal in response to the image light 10. The intensity of the sensing signal outputted from the photo detective module 120 is proportional to the intensity of the image light 10 incident into the photo detective module 120. The sensing signal is inputted into the control module 130.

The photo detective module 120 is installed in a pocket portion 114 having a pocket shape so as to detect the image light 10 that is directed from an external region of the body 110 to an internal region of the body 110.

The photo detective module 120 may be a photo sensor such as a photo diode, a photo transistor, or a color sensor that selectively perceives a light having a frequency corresponding to a red color, a light having a frequency corresponding to a green color and a third light having a frequency corresponding to a blue color.

The control module 130 is disposed in the body 110 or on the body 110. The control module outputs a control signal in response to the sensing signal outputted from the photo detective module 120. The control signal turns on or turns off the light generating module 140. The control module 130 determines the level of the control signal based on the level of the sensing signal outputted from the photo detective module 120. The control module 130 compares the level of the sensing signal with the level of a predetermined reference signal, and outputs the control signal when the level of the sensing signal is higher than the level of the predetermined reference signal.

The light generating module 140 is disposed in the body 110 or on the body 110. For example, the light generating module 140 may be installed at another end of the body 110. A driving power signal is applied to the light generating module 140 in response to the control signal. For example, the driving power signal may be supplied from a power supply module 150 such as a dry cell battery or mercury battery installed in the body 110. The driving power signal may be supplied from an external power source.

For example, the light generating module 140 may be a light emitting diode (LED) generating white light similar to sun light. The white light generated from the light generating module 140 is sensing light 142. The sensing light 142 generated from the light generating module 140 exits from the body 110 through the opening 112.

Hereinafter, the operation of the light pen is illustrated with reference to FIG. 1.

First, when an user moves the light pen 100 toward a surface of a display device, on which the photo detective elements are disposed and the image light 10 is displayed, the image light 10 generated from the display device is detected by the photo detective module 120 of the light pen 100. The photo detective module 120 outputs the control signal to the control module 130 in response to the image light 10.

The control module generates the control signal in response to the sensing signal outputted from the photo detective module 120. The driving power signal is applied to the light generating module 140 in response to the control signal. The light generating module 140 generates the sensing light 142 directed toward outside of the body 110 in response to the driving power signal.

For example, the sensing signal 142 may proceed in reverse direction to the image light 10. The image light 10 is incident into the light pen 100 from outside the light pen 100, and the sensing light 142 exits from the light pen 100 toward outside the light pen 100. The sensing light 142 generated from the light pen 100 is applied to the photo detective element of the display device.

According to above embodiment of the present invention, since the light pen 100 detects the light generated from the surface of the display device and generates the sensing light 142, the user need not turn on or turn off the light pen 100, need not apply pressure on the surface of the display device so as to use the light pen 100. In addition, since the sensing light is generated only when the user brings the light pen 100 into contact with the surface of the display device, the power consumption may be greatly reduced.

Embodiment 2 of a Light Pen

Figure 2:
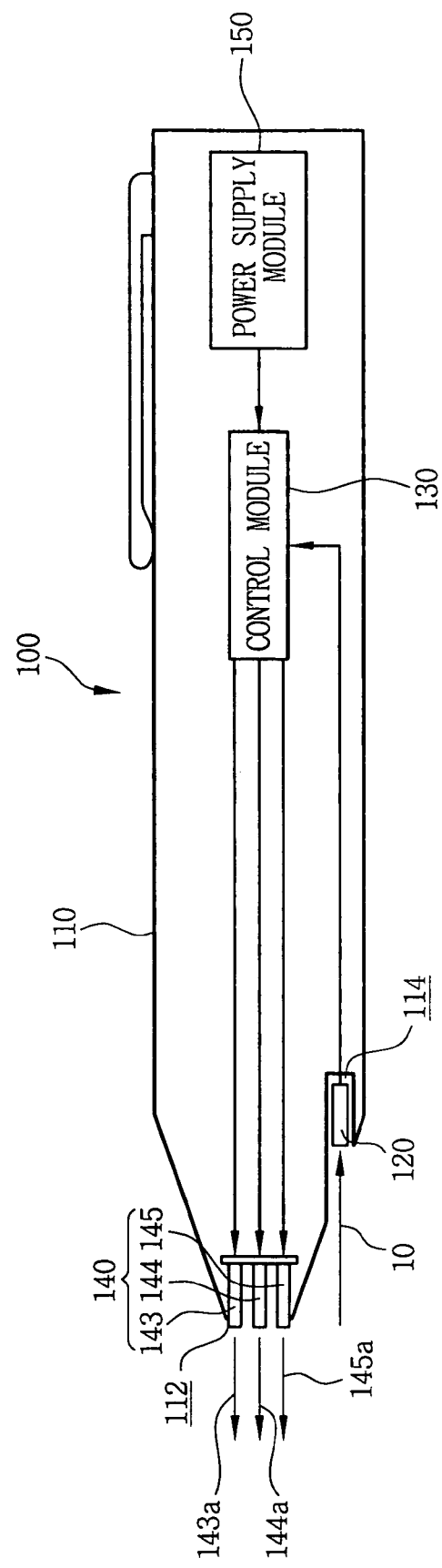
FIG. 2 is a schematic view showing a light pen according to a second exemplary embodiment of the present invention.

FIG. 2 is a schematic view showing a light pen according to a second exemplary embodiment of the present invention. In embodiment 2, all elements except the light generating module denote the same elements in embodiment 1, and will not be further described below to avoid a redundancy.

The light generating module 140 may be comprised of various combination(s) of a red light emitting diode (LED) 143, a green LED 144 and a blue visible light emitting diode (LED) 145. The red LED generates red visible light 143a having the frequency corresponding to a red color, the green LED generates green visible light 144a having the frequency corresponding to a green color, and the blue LED generates blue visible light 145a having the frequency corresponding to a blue color.

For example, the light generating module 140 may be comprised of only one among the red light emitting diode (LED) 143, the green LED 144 and the blue light emitting diode (LED) 145. In addition, the light generating module 140 may be comprised of more than two among the red light emitting diode (LED) 143, the green LED 144 and the blue light emitting diode (LED) 145.

In this embodiment, the light generating module 140 includes the red light emitting diode (LED) 143, a green LED 144 and blue light emitting diode (LED) 145. The red light emitting diode (LED) 143, the green LED 144 and the blue light emitting diode (LED) 145 may be respectively connected to the control module 130. Therefore, the control module 130 is able to apply driving power signal to the red light emitting diode (LED) 143, the green LED 144 and the blue light emitting diode (LED) 145, respectively.

In this embodiment, the red light emitting diode (LED) 143, the green LED 144 and the blue light emitting diode (LED) 145 are alternately on and off so that red visible light 143a, green visible light 144a and blue visible light 145a are alternately generated.

Figure 3:
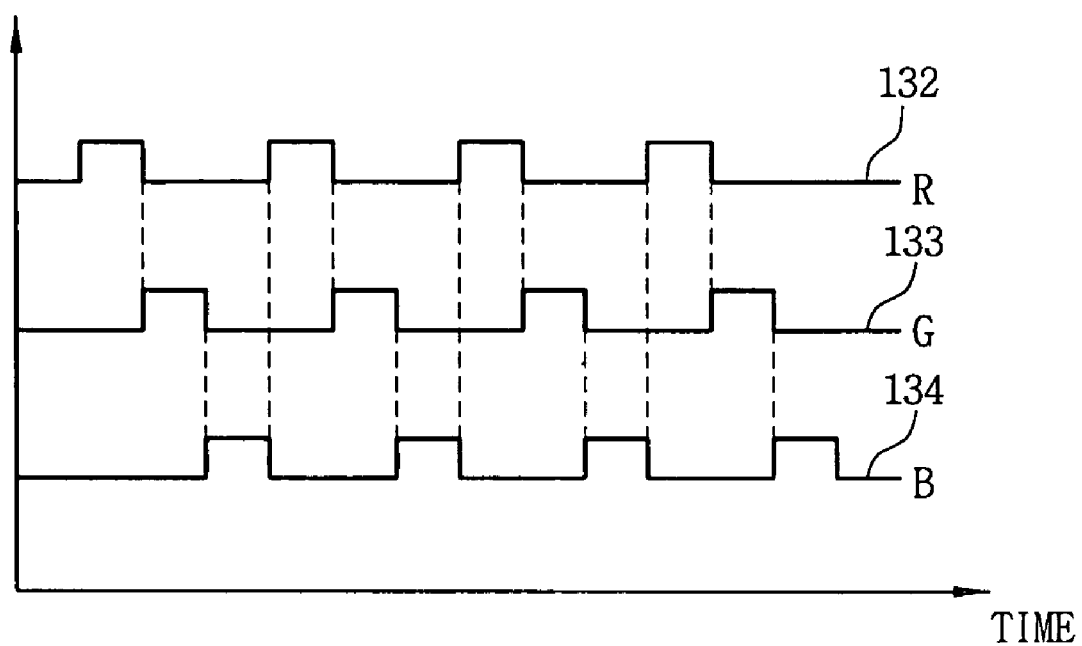
FIG. 3 is a graph showing driving power pulses generated from a light emitting module of the light pen of FIG. 2.

FIG. 3 is a graph showing driving power pulses generated from a light emitting module of the light pen of FIG. 2.

Referring to FIGS. 2 and 3, the red, green and blue LEDs 143, 144 and 145 alternately are on and off. The control module 130 applies a first driving power pulse 132 to the red LED 143 so as to turn on the red LED 143 for a time period of a pulse width, so that red visible light 143a is generated from the red LED 143.

As soon as the red LED 143 is turned off, the control module 130 applies a second driving power pulse 133 to the green LED 144 so as to turn on the green LED 144 for a time period of a pulse width, so that green visible light 144a is generated from the green LED 143.

As soon as the green LED 144 is turned off, the control module 130 applies a third driving power pulse 134 to the blue LED 145 so as to turn on the blue LED 145 for a time period of a pulse width, so that blue visible light 145a is generated from the blue LED 143.

The control module 130 repeats above mentioned processes and alternately turns on and off the red, green and blue LEDs 143, 144 and 145 so the red, green and blue LEDs. 143, 144 and 145 generate red, green and blue visible light, respectively.

According to above embodiment, the light pen outputs at least one of red, green and blue visible light so that the photo detective element of the display device may recognizes the light generated from the light pen effectively.

Especially, since the display device such as the liquid crystal display device has color filters, the light pen generates light such as red, green or blue visible light, and the light such as red, green or blue visible light may pass through the color filters, so that the photo detective element of the display device may recognizes the light generated from the light pen effectively. In addition, the light pen alternately outputs red, green and blue visible light, so that the photo detective element of the display device may recognizes the light generated from the light pen effectively under the circumstance where sun light or indoor lightning are provided.

Embodiment 3 of a Light Pen

Figure 4:
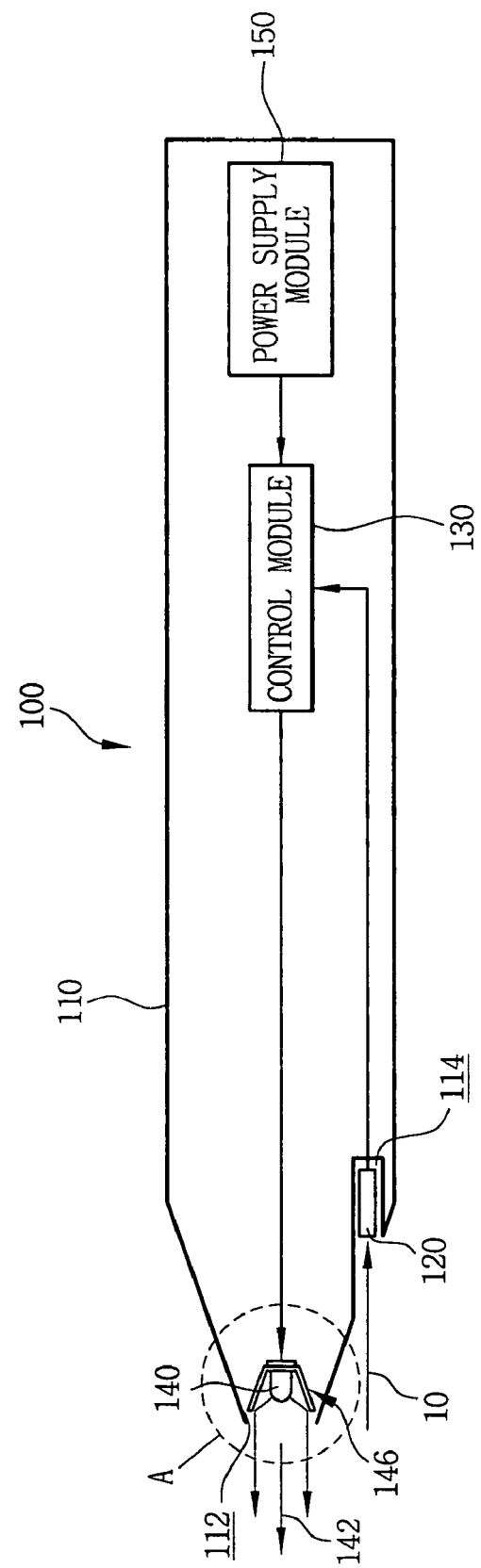
FIG. 4 is a schematic view showing a light pen according to a third exemplary embodiment of the present invention.
Figure 5:
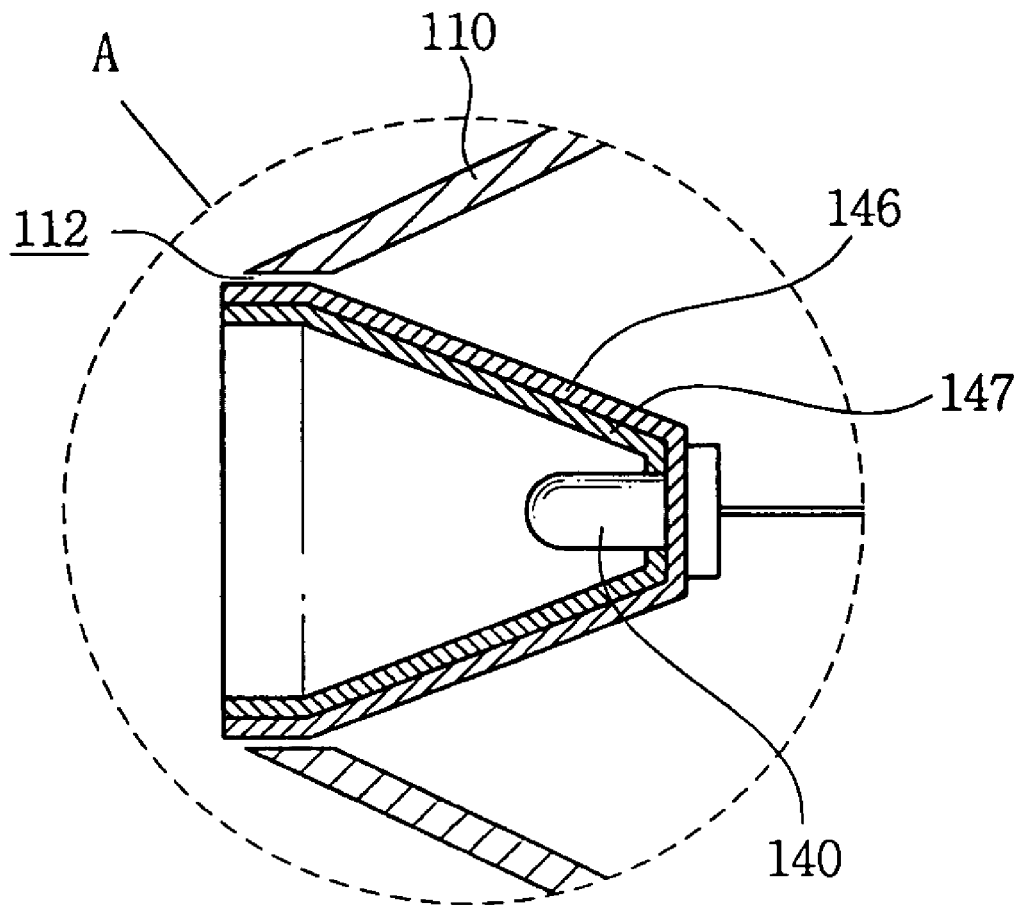
FIG. 5 is a partially enlarged view showing 'A' of FIG. 4.

FIG. 4 is a schematic view showing a light pen according to a third exemplary embodiment of the present invention, and FIG. 5 is a partially enlarged view showing 'A' of FIG. 4. In embodiment 3, all elements except the light concentrating cover denote the same elements in embodiment 1, and will not be further described below to avoid a redundancy.

Referring to FIG. 4 or FIG. 5, the light concentrating cover 146 concentrates the sensing light 142 generated from the light generating module 140 and enhances the brightness of the sensing light 142.

The light concentrating cover 146 may have a shape of cup, and is disposed near the opening 112. The light generating module 140 connected to the control module 130 is disposed in the light concentrating cover 146. The sensing light 142 generated from the light generating module 140 is reflected from the light concentrating cover 146, and the sensing light 142 is concentrated.

A light reflection layer 147 may be further installed inner surface of the light concentrating cover 146 so that the light concentrating cover 146 may concentrate light effectively. For example, the light reflection layer 147 comprises silver (Ag), aluminum (Al) or aluminum alloy.

According to above embodiment, the light generated from the light generating module is concentrated without using lens, so that the brightness of the sensing light may be enhanced and the photo detective element of the display device may recognizes the sensing light effectively.

Embodiment 4 of a Light Pen

Figure 6:
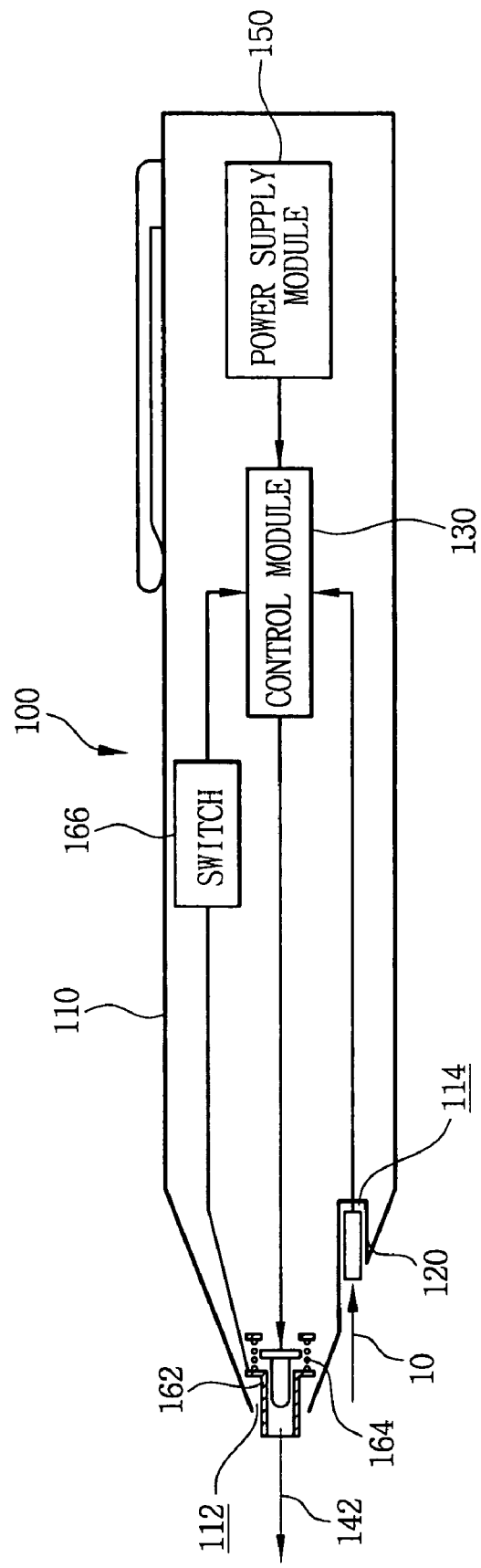
FIG. 6 is a schematic view showing a light pen according to a fourth exemplary embodiment of the present invention.

FIG. 6 is a schematic view showing a light pen according to a fourth exemplary embodiment of the present invention. In embodiment 4, all elements except a tip and switch denote the same elements in embodiment 1, and will not be further described below to avoid a redundancy.

A tip 162 is disposed near the opening 112. The tip 162 has a cylindrical flange shape. The tip 162 contacts the surface of the display device, and the light (Hereinafter, referred to as image light) that has image information is generated from the surface of the display device. The sensing light 142 generated from the light generating module 140 exits from the tip 162. An elastic member 164 is attached to one end of the tip 162. The tip 162 is compressed backward when the tip 162 presses the surface of the display device, and is restored to an original position when the tip 162 is separated from the surface of the display device.

An on/off switch 166 is connected to the tip 162. The switch 166 outputs a switch signal when the tip 162 contacts the surface of the display device and is separated from the surface of the display device. The switch signal allows for the control module 130 to provide the light generating module 130 with the driving power signal. The switch 166 stops outputting the switch signal to the control module 130 when the tip 162 is restored to the original position. Therefore, the driving power signal is no more provided to the light generating module 130.

The control module 130 does not response to the signal generated from the switch 166 when the light generating module 140 is turned on or off in response to the sensing signal generated from the photo detective module 120.

According to above embodiment, the light pen has the switch for controlling the light generating module by detecting whether the tip contacts the surface of the display device. Therefore, the light pen may operates normally even when the image light exiting from the surface of the display device has very low brightness or the image light may not exit from the surface of the display device.

Embodiment 5 of a Light Pen

Figure 7:
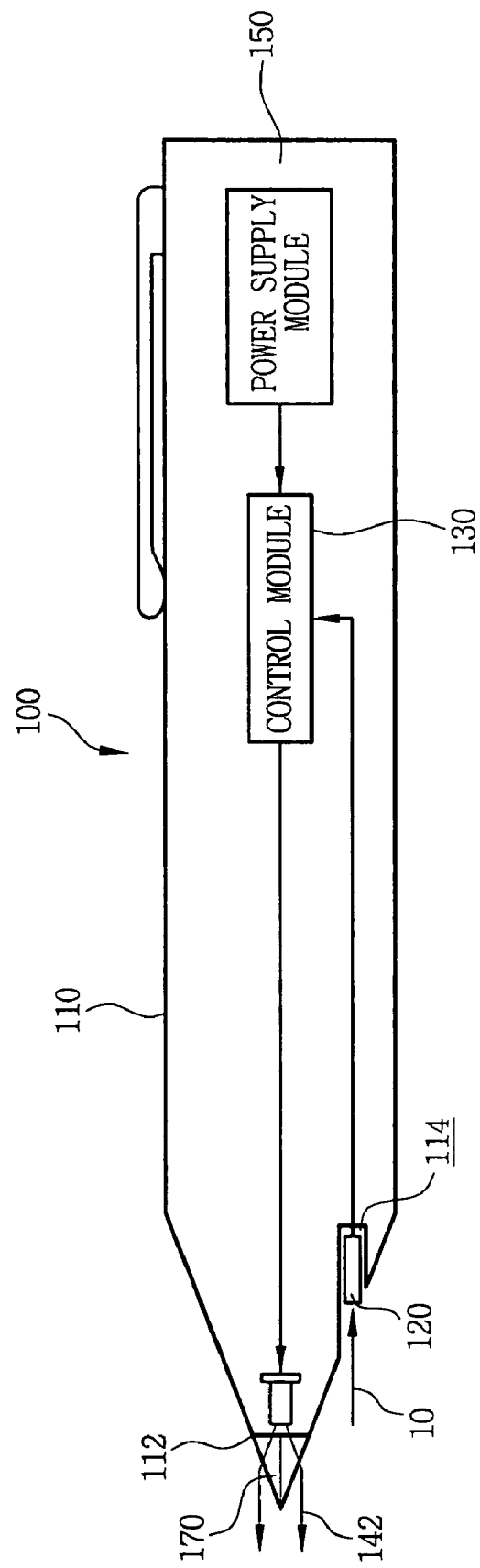
FIG. 7 is a schematic view showing a light pen according to a fifth exemplary embodiment of the present invention.

FIG. 7 is a schematic view showing a light pen according to a fifth exemplary embodiment of the present invention. In embodiment 5, all elements except a light concentrating member denote the same elements in embodiment 1, and will not be further described below to avoid a redundancy.

Referring to FIG. 7, the light concentrating member 170 is disposed near the opening 112 of the body 110 so that the sensing light 142 generated from the light generating module 140 may be concentrated onto a small area of the surface of the display device. For example, the light concentrating member 170 a semi-circular, triangular pyramid or polypyramid shape. The light concentrating member 170 comprises transparent resin so that the sensing light 142 may pass through the light concentrating member 170. The refractivity of the light concentrating member 170 is less than that of the air.

The sensing light 142 generated from the light generating module 140 exits from the opening 112 and is incident onto the light concentrating member 170. The sensing light 142 incident onto the light concentrating member 170 passes through the light concentrating member 170, is refracted therefrom by the refraction law and exits therefrom. The sensing light 142 exiting from the light concentrating member 170 is applied onto a small area of the surface of the display device.

According to above embodiment, since the sensing light exiting from the light pen is applied onto a small area of the surface of the display device, the brightness of the sensing light is enhanced and the user may use the light pen accurately.

Embodiment 6 of a Light Pen

Figure 8:
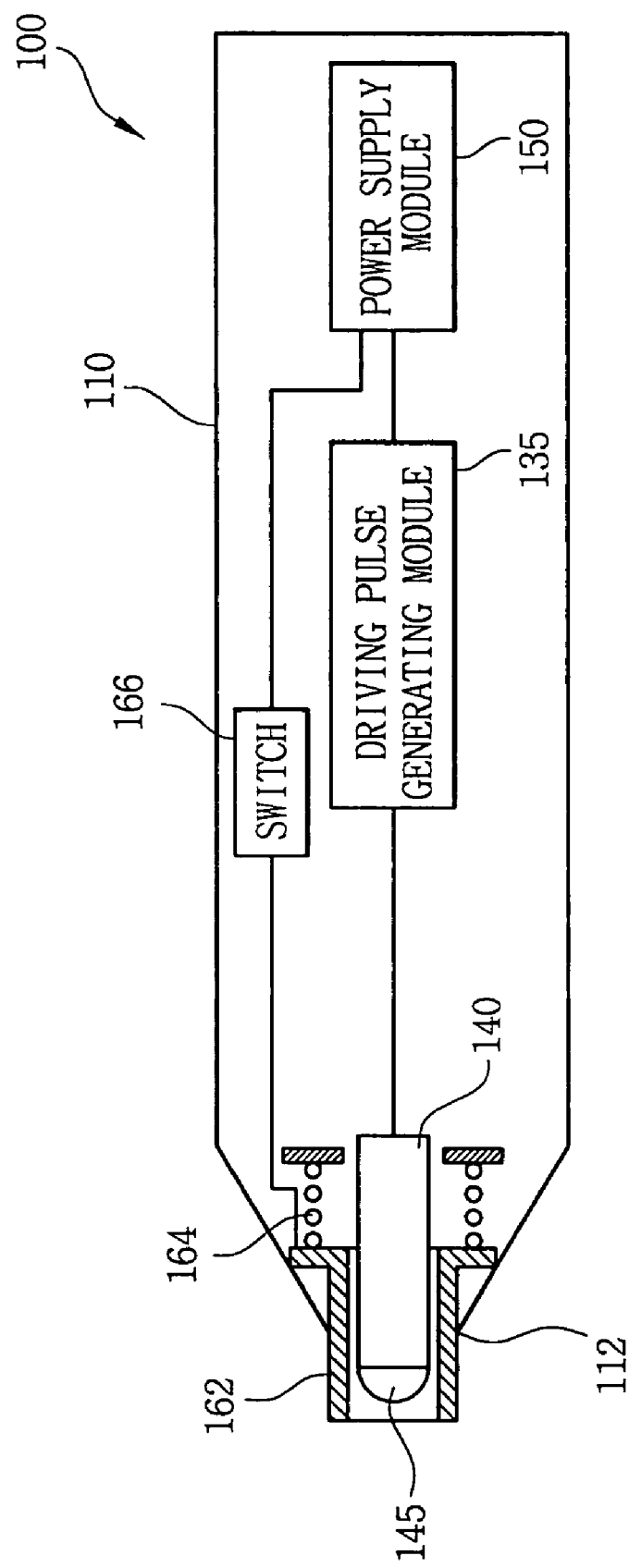
FIG. 8 is a schematic view showing a light pen according to a sixth exemplary embodiment of the present invention.

FIG. 8 is a schematic view showing a light pen according to a sixth exemplary embodiment of the present invention. In embodiment 6, all elements except a driving pulse generating module denote the same elements in embodiment 4, and will not be further described below to avoid a redundancy.

Referring to FIG. 8, the driving pulse generating module 135 is installed in the control module 130. The driving pulse generating module 135 includes a circuit that converts a DC power signal into a pulse signal. The driving pulse generating module 135 generates a first pulse having a first frequency during a first time period and a second pulse having a second frequency during a second time period. The first and second pulses are outputted to the light generating module 140.

Figure 9:
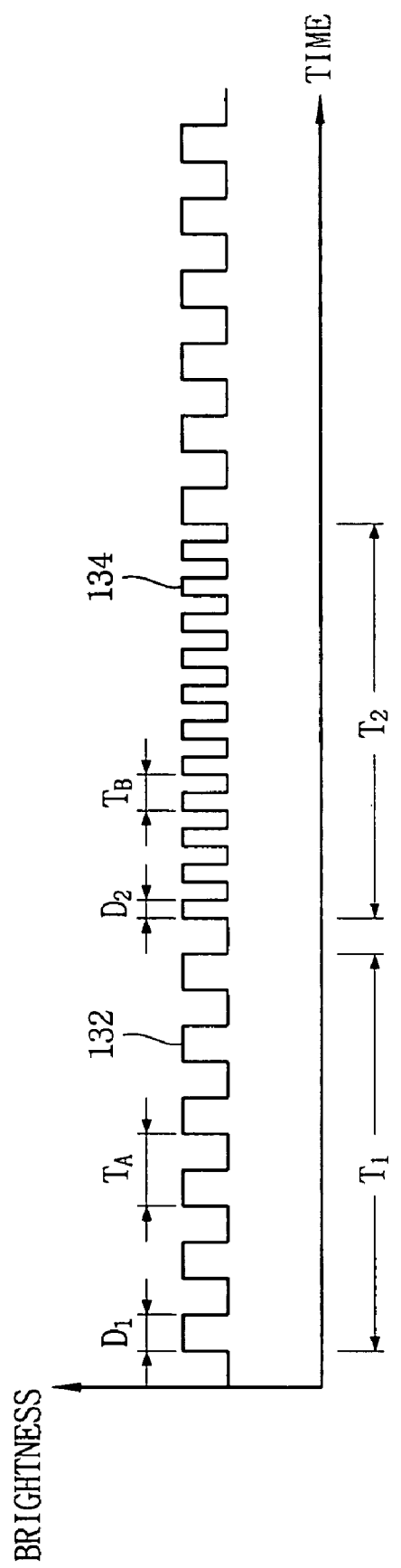
FIG. 9 is a graph showing first and second driving power pulses generated from a driving pulse generating module of FIG. 8.

FIG. 9 is a graph showing first and second driving power pulses generated from a driving pulse generating module of FIG. 8.

Referring to FIGS. 8 and 9, the driving pulse generating module 135 outputs the first pulse 132 having the first frequency. The driving pulse generating module 135 outputs the first pulse 132 for the first time period T1. The first pulse 132 has the first cycle period $T_A$ and a first pulse width $D_1$.

The driving pulse generating module 135 outputs the second pulse having the second frequency after the first time period T1. The driving pulse generating module 135 outputs the second pulse 134 for the second time period T2. The second pulse 134 has the second cycle period $T_B$ and a second pulse width $D_2$.

The second frequency is longer than the first frequency. Thus, the second pulse width $D_2$ is narrower than the first pulse width $D_1$. The second cycle period $T_B$ is shorter than the first cycle period $T_A$.

The driving pulse generating module 135 alternately outputs the first pulse 132 or the second pulse 134.

The light generating module 140 is disposed inside the body 110 to face the opening 112. For example, the light generating module 140 includes a light emitting diode that generates light or a semiconductor device that emits a laser beam in response to the first and second pulses 132 and 134. A light concentrating member 145 is further disposed at an end of the light generating module 140 from which light is generated and concentrates the light generated from the light generating module 140 so as to enhance the brightness of the light.

The light generating module 140 is turned on to generate light or turned off by the pulses generated from the driving pulse generating module 135.

Figure 10:
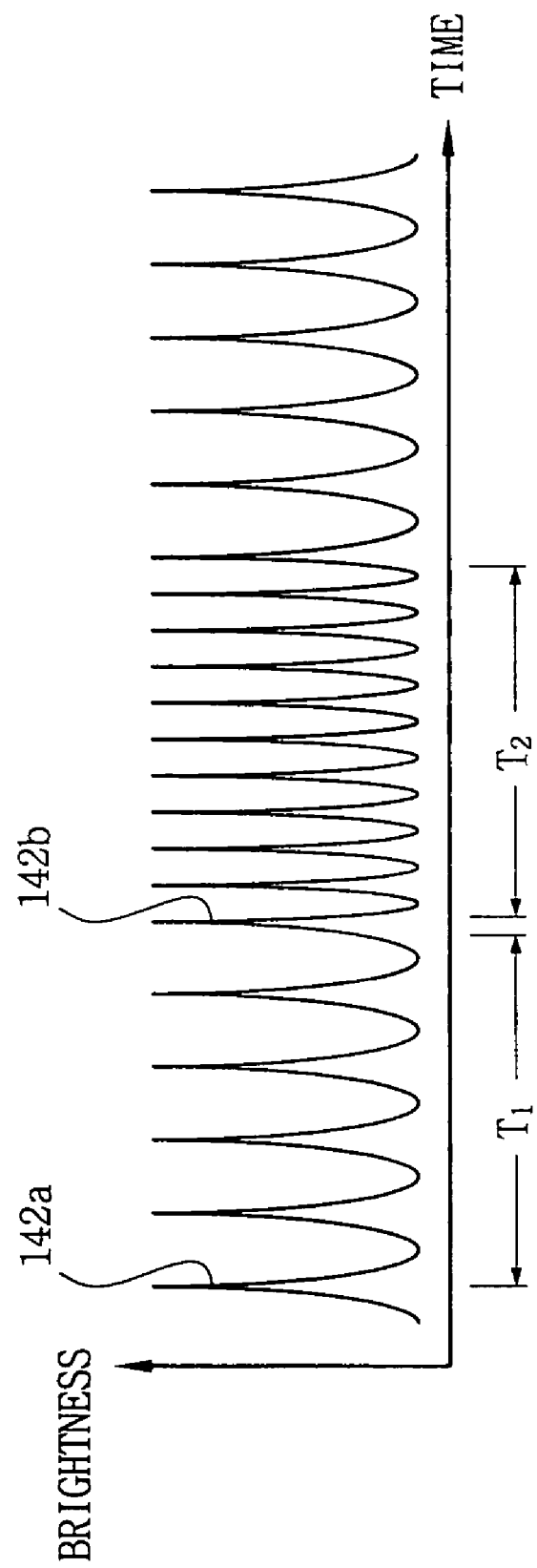
FIG. 10 is a graph showing brightness measured at the light emitting module in response to the driving power pulses of FIG. 9.

FIG. 10 is a graph showing brightness measured at the light emitting module in response to the driving power pulses of FIG. 9.

Referring to FIGS. 9 and 10, the light generating module 140 generates a first sensing light 142a for substantially the first time period T1 in response to the first pulse 132 generated from the driving pulse generating module 135. The first sensing light 142a flickers with substantially the first cycle period. The brightness of the first sensing light 142a changes abruptly with substantially the first cycle period.

The light generating module 140 generates a second sensing light 142b for substantially the second time period T2 in response to the second pulse 134 generated from the driving pulse generating module 135. The second sensing light 142b flickers with substantially the second cycle period. The brightness of the second sensing light 142b changes abruptly with substantially the second cycle period. The first and second sensing light exit from the tip 162 of the body 110.

According to above embodiment, the light pen generates light having frequencies different from that of sun light or indoor lightning, so that the photo detective element of the display device effectively recognizes the light generated from the light pen.

Embodiment 7 of a Light Pen

Figure 11:
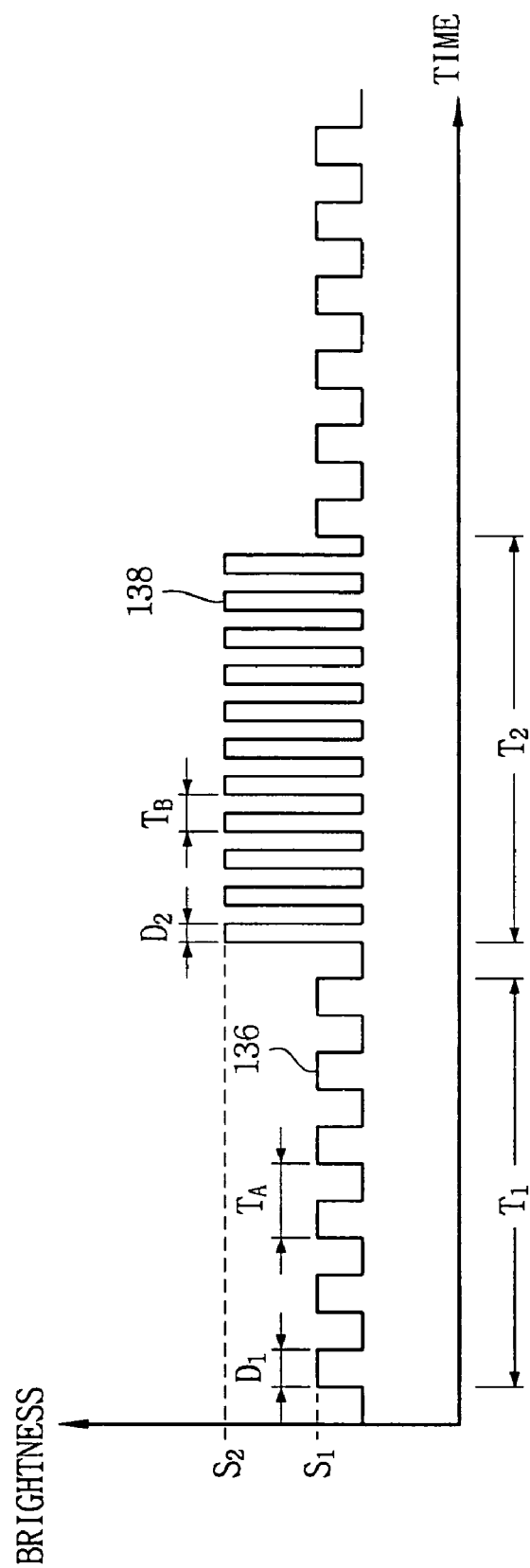
FIG. 11 is a graph showing first and second driving power pulses generated from a driving pulse generating module according to a seventh exemplary embodiment of the present invention.

FIG. 11 is a graph showing first and second driving power pulses generated from a driving pulse generating module according to a seventh exemplary embodiment of the present invention. In embodiment 7, all elements except the pulses generated from the driving pulse generating module denote the same elements in embodiment 1, and will not be further described below to avoid a redundancy.

Referring to FIGS. 8 and 11, the driving pulse generating module 135 generates a first pulse 136 having a first frequency and a first intensity S1 during a first time period T1. The first pulse 136 has the first cycle period $T_A$ and a first pulse width $D_1$.

The driving pulse generating module 135 outputs a second pulse 138 having the second frequency after the first time period T1. The driving pulse generating module 135 outputs the second pulse 138 for the second time period T2. The second pulse 138 has the second cycle period $T_B$, a second intensity S2 larger than the first intensity S1 and a second pulse width $D_2$.

The second frequency is longer than the first frequency. Thus, the second pulse width $D_2$ is narrower than the first pulse width $D_1$. The second cycle period $T_B$ is shorter than the first cycle period $T_A$.

The driving pulse generating module 135 alternately outputs the first pulse 136 or the second pulse 138.

Figure 12:
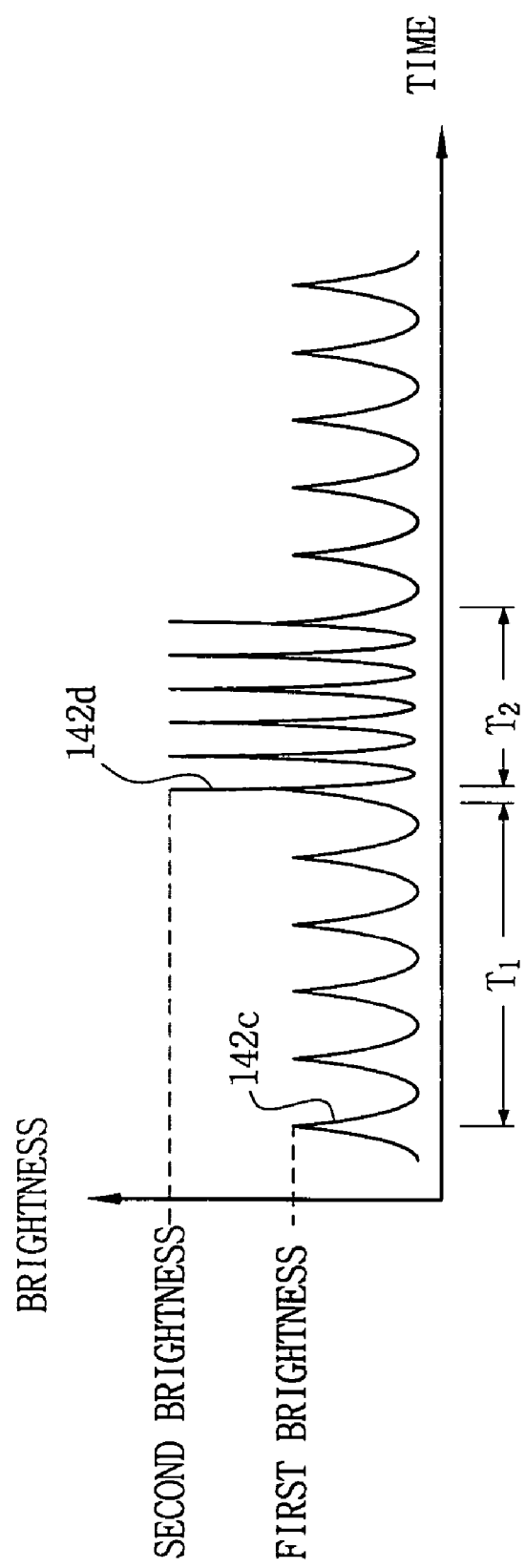
FIG. 12 is a graph showing brightness measured at the light emitting module in response to the driving power pulses of FIG. 11.

FIG. 12 is a graph showing brightness measured at the light emitting module in response to the driving power pulses of FIG. 11.

Referring to FIGS. 11 and 12, the light generating module 140 generates a third sensing light 142c for substantially the first time period T1 in response to the first pulse 132 generated from the driving pulse generating module 135. The third sensing light 142c flickers with substantially the first frequency for substantially the first time period T1 and has a first brightness.

The light generating module 140 generates a fourth sensing light 142d for substantially the second time period T2 in response to the second pulse 138 generated from the driving pulse generating module 135. The fourth sensing light 142d flickers with substantially the second frequency for substantially the second time period T2. The brightness of the fourth sensing light 142d is larger than that of the third sensing light 142c.

According to above embodiment, the light pen generates light having frequencies and brightness different from those of sun light or indoor lightning, so that the photo detective element of the display device effectively recognizes the light generated from the light pen.

Embodiment 8 of a Light Pen

Figure 13:
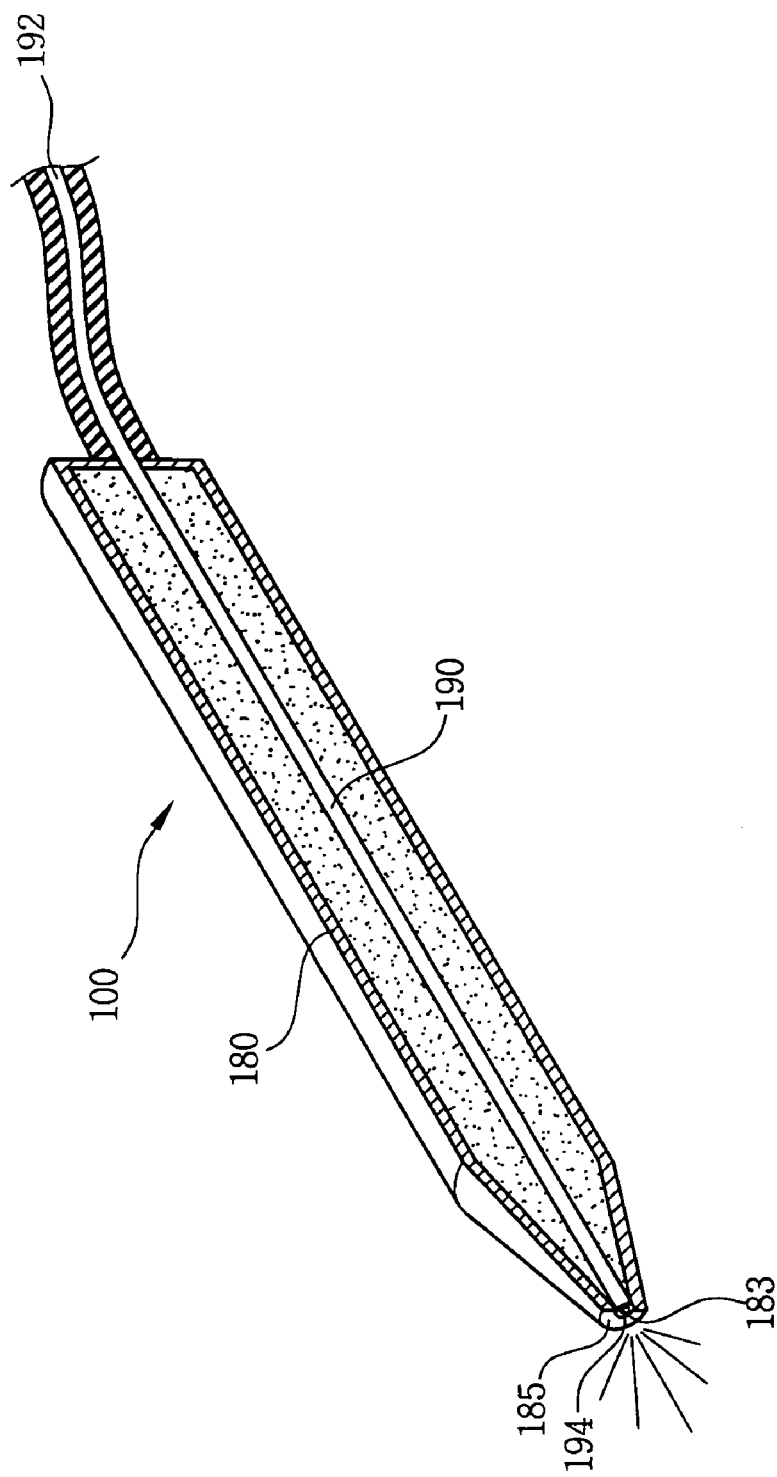
FIG. 13 is a partial cross-sectional perspective view showing a light pen according to an eighth exemplary embodiment of the present invention.

FIG. 13 is a partial cross-sectional perspective view showing a light pen according to an eighth exemplary embodiment of the present invention.

Referring to FIG. 8, the light pen 100 includes a body 180 and a light guiding unit 190. The body 180 has a shape of a pen and has an opening 183 from which light exit at a first end 185 of the body 180.

The light guiding unit guides the sensing light generated from an external source into the body 180 toward the first end of the body 180. For example, the light guiding unit 190 includes an optical cable having at least one optical fiber.

A light entering part 192 is connected to dummy pixels disposed on a non-effective display region of the liquid crystal display panel. The sensing light generated from an external source is incident into the light entering part 192. The light exiting from the dummy pixels is incident into the light guiding unit 190 and exits from a light exiting part 194. Optionally, the light entering part 192 receives sensing light generated from lightning equipment. The sensing light generated from the light lightning equipment, as shown in FIG. 6 or FIG. 7, flickers with various frequencies.

The light exiting part 194 is extended to the opening 183 of the body 180 so as to enhance the brightness of the light supplied to the optical fiber.

According to above embodiment, the light pen has a simple structure and generates light having various frequencies, so that the photo detective element of the display device effectively recognizes the light generated from the light pen.

Embodiment 1 of a Photo Detective Liquid Crystal Display Device

Figure 14:
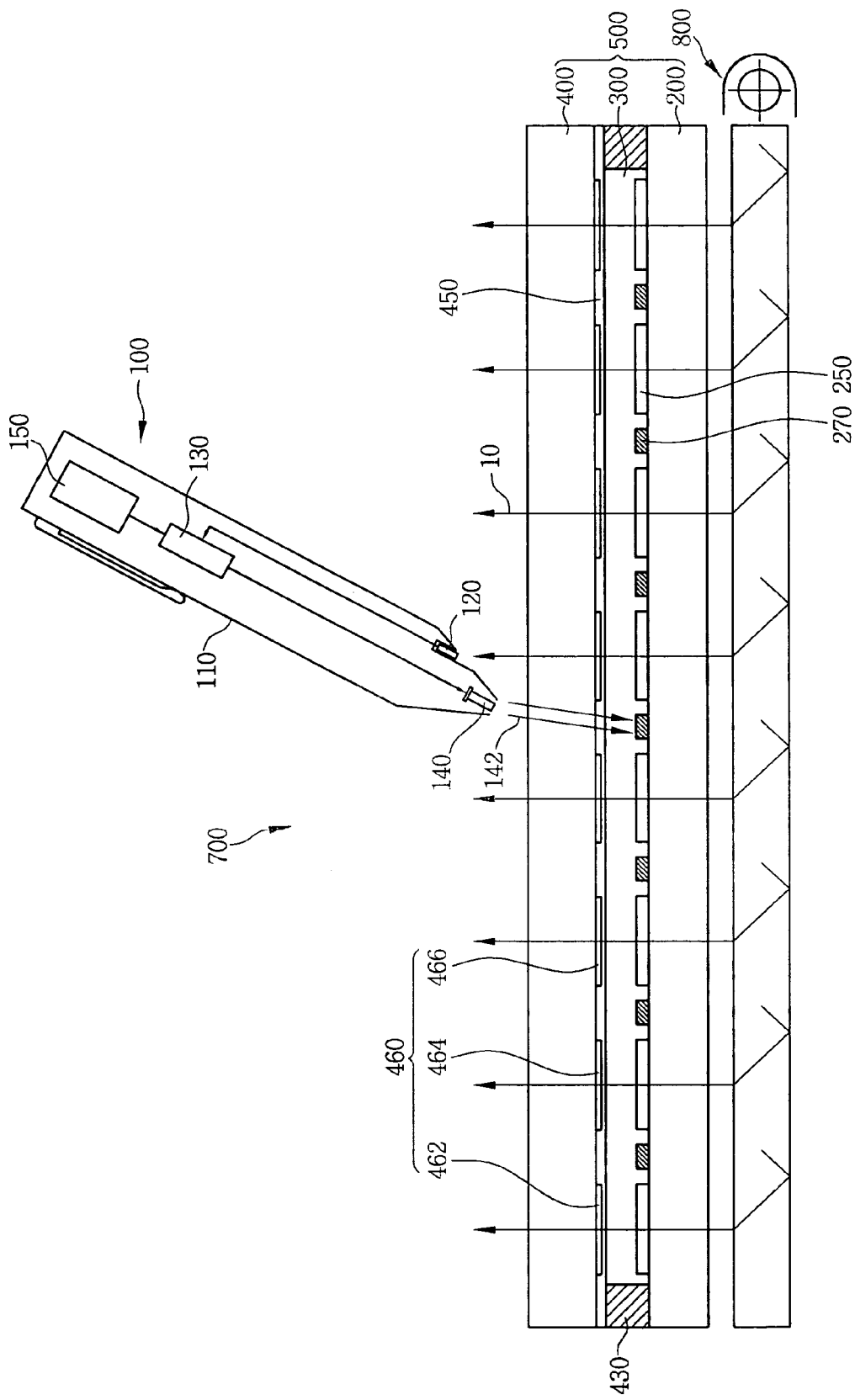
FIG. 14 is a schematic view showing a photo detective liquid crystal display device according to one example of the present invention.
Figure 15:
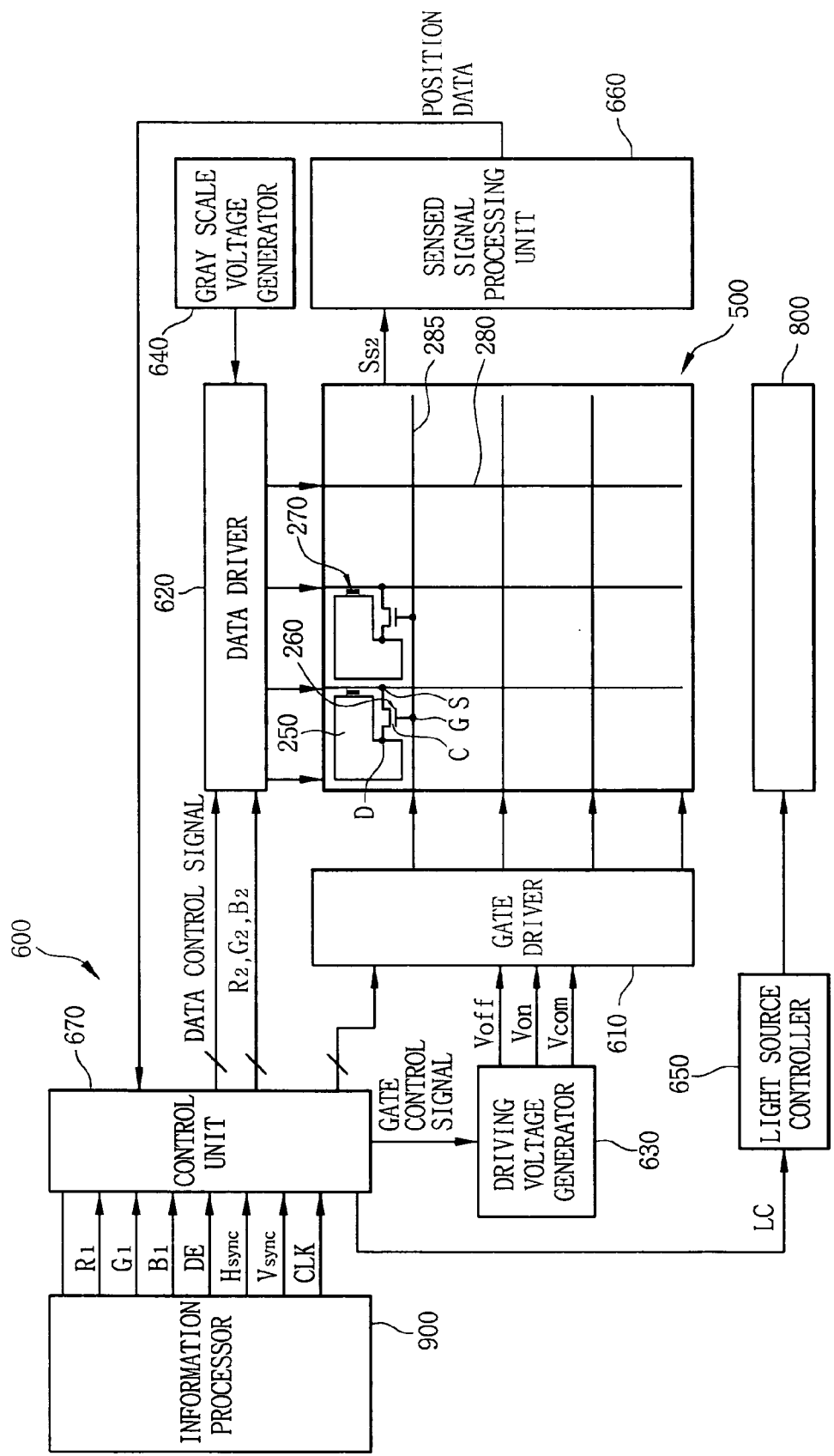
FIG. 15 is a schematic view showing a photo detective liquid crystal display panel according to one example of the present invention.

FIG. 14 is a schematic view showing a photo detective liquid crystal display device according to one example of the present invention, and FIG. 15 is a schematic view showing a photo detective liquid crystal display panel according to one example of the present invention.

Referring to FIGS. 14 and 15, the photo detective liquid crystal display device 700 includes a light pen 100, a liquid crystal display panel and a driving module 600.

Since the light pens are already described in the embodiments 1 through 8 of the light pen, the light pen 100 will not be further described below to avoid a redundancy. The light pen of this embodiment is one of the light pens described in the embodiments 1 through 8 of the light pen. For example, in the embodiment 1 of the photo detective liquid crystal display device, the light pen of FIG. 1 is used. Hereinafter, a first sensing signal is referred to as a signal that is generated by the photo detective module 120 in responsive to image light 10. The first sensing signal is different from a second sensing signal generated by the photo detective element of the liquid crystal display panel 500.

The liquid crystal display panel 500 includes a first substrate 200, a second substrate 400 facing the first substrate 200, a liquid crystal layer 300, first electrodes 250, a second electrode 450 and photo detective elements 270.

For example, the first and second substrates 200 and 400 comprise transparent glass. While the first substrate 200 is disposed to face the second substrate 400, a sealing member 430 is formed in the peripheral portion of the first and second substrates 200 and 400, and the liquid crystal layer 300 is interposed between the first and second substrate 200 and 400 to be surrounded by the sealing member 430.

The liquid crystal molecules of the liquid crystal layer 300 is arranged according to the electric field applied to the liquid crystal layer 300, so that transmissivity of the light incident into the liquid crystal layer 300 is changed according the alignment angles of the liquid crystal molecules.

A plurality of first electrodes 250 is disposed on the first substrate 200, and the second electrode 450 is disposed on the second substrate 400. The first electrode 250 faces the second electrode 450 and the electric field is applied between the first and second electrodes 250 and 450.

For example, when the liquid crystal panel 500 displays a full-color image and has 1024*768 resolution, 1024*768*3 first electrodes 250 are arranged in a matrix shape on the first substrate 200.

The first electrode 250 comprises transparent and conductive indium tin oxide (ITO) or indium zinc oxide (IZO).

Referring to FIG. 15, a plurality of thin film transistors (TFTs) 260 is electrically connected to the first electrodes 250. Pixel voltage is applied to the first electrodes 250 through the thin film transistors 260.

The thin film transistor includes a gate electrode (G), a source electrode (S) and a drain electrode (D).

Hereinafter, a control electrode represents a gate electrode of the thin film transistor, a first current electrode represents a source electrode (or a drain electrode) of the thin film transistor, and a second current electrode represents a drain electrode (or a source electrode) of the thin film transistor.

The drain electrode is electrically connected to the first electrode 250. The gate electrodes are commonly connected to gate lines 285. The source electrodes are commonly connected to data lines 280.

The second electrode 450 is formed on an entire surface of the second substrate 400 to face the first electrodes 250. The second electrode 450 comprises transparent and conductive indium tin oxide (ITO) or indium zinc oxide (IZO). Common voltage is applied to the second electrode 450.

Color filters 460 are disposed between the second electrodes 450 and the second substrate 400. The color filters 460 are arranged on the second substrate 400 to have substantially the same arrangement as the first electrodes 450. Each of the color filters 460 has substantially the same area as the first electrodes. The color filters 460 include a red color filter 462, a green color filter 464 and a blue color filter 466. The red color filter 462 passes light having wavelength corresponding to red visible light, the green color filter 464 passes light having wavelength corresponding to green visible light, and the blue color filter 466 passes light having wavelength corresponding to blue visible light.

The photo detective elements 270 are disposed between the first electrodes 250 on the first substrate 200. The photo detective elements 270 are arranged in a matrix shape.

Since the configuration and function of the photo detective element 270 is disclosed in detail in KR Patent Application No. 2003-12768 (entitled "Liquid crystal display device and method of manufacturing the same"), detailed description will not be shown below. According to the KR Patent Application No. 2003-12768, the photo detective element includes a sensing thin film transistor and a switching thin film transistor. The sensing thin film transistor receives light generated from external source, and the switching thin film transistor receives the output of the sensing thin film transistor and generates the second sensing signal ($S_{s2}$). The photo detective element 270 generates the second sensing signal ($S_{s2}$) in response to the light generated from external source, for example, the sensing light 142 generated from the light pen 100. The second sensing signal includes position information, and the position information has a position to which the sensing light 142 is incident. Above mentioned KR Patent Application No. 2003-12768 is incorporated hereby.

Referring again to FIG. 15, the driving module 600 includes a gate driver 610, data driver 620, a driving voltage generator 630, a gray scale voltage generator 640, a light source controller 650, a sensed signal processing unit 660 and a control unit 670.

The driving voltage generator 630 is connected to the gate driver 610, the gray scale voltage generator 640 is connected to the data driver 620. The light source controller 650 is connected to a backlight assembly 800 for supplying light to the liquid crystal display panel 500 and controls the backlight assembly 800. The sensed signal processing unit 660 processes the second sensing signal generated from the photo detective elements 270.

The gate driver 610 is connected to each of the gate lines 285 and applies gate driving signal generated from the driving voltage generator 630 to each of the gate lines 285. The gate driving signal includes a gate turn-on signal ($V_{on}$), a gate turn-on signal ($V_{off}$) and a common voltage signal ($V_{com}$). The common voltage signal ($V_{com}$) is applied to the common electrode of the second substrate 400.

The data driver 620 is connected to each of the data lines 280 and applies the gray scale voltage generated from the gray scale voltage generator 640 to each of the data lines 280.

The control unit 670 controls the gate driver 610, the data driver 620, the driving voltage generator 630, the gray scale voltage generator 640, the light source controller 650 and the sensed signal processing unit 660.

The control unit 670 receives video signals from external information processor 900. The video signals includes first red gray scale data (R1), first green gray scale data (G1), first blue gray scale data (B1), a vertical synchronizing signal ($V_{sync}$) a horizontal synchronizing signal ($H_{sync}$), a main clock signal (CLK) and data enable signal (DE), etc.

The control unit 670 converts the first red, green and blue gray scale data (R1, G1, B1) into second red, green and blue gray scale data (R2, G2, B2), respectively, so that the second red, green and blue gray scale data (R2, G2, B2) are used by the liquid crystal display panel.

The control unit 670 outputs the second red, green and blue gray scale data (R2, G2, B2) and data control signal to the data driver 620. The data control signal includes a horizontal synchronization start signal, a load signal and a data clock signal, etc. The second red, green and blue gray scale data (R2, G2, B2) are inputted to the first, second, . . . , last data lines in response to the horizontal synchronization start signal. Analogue gray scale data is applied to the data lines 280 in response to the load signal.

In addition, the control unit 670 outputs a gate control signal to the gate driver 610. The gate control signal includes a vertical synchronization start signal (STV), a gate clock signal (CPV) and a gate on enable signal (OE). A gate turn-on pulse is applied to the gate lines in response to the vertical synchronization start signal (STV). The gate line is selected when the gate turn-on pulse is applied to the gate line. The gate clock signal (CPV) controls the gate turn-on pulse to be outputted to the gate lines. The pulse width of the gate turn-on pulse is controlled by the gate on enable signal (OE), so that the gate turn-on pulse is sequentially applied to adjacent gate lines. The gate clock signal (CPV) and the gate on enable signal (OE) are supplied to the driving voltage generator 630.

The data driver 620 receives analog gray scale voltage from the gray scale voltage generator 640, and outputs the analog gray scale voltage to the data lines 280 in response to the data control signal. The analog gray scale voltage corresponds to the bit value of the second red, green and blue gray scale data (R2, G2, B2). The gate driver 610 applies the gate turn-on pulse to the first gate line 285 in response to the gate control signal from the control unit 670, so that the thin film transistors connected to the first gate line are turned on.

The analog gray scale voltage is applied to the first electrode 250 through the drain electrode of the thin film transistors to which the gate turn-on pulse is applied. The control unit 670 performs above procedure for one frame time, for example, about 16.6 ms. For example, the control unit 670 displays 30 frames of images per a second so at to display letters, images and moving pictures.

After one frame time, the analog gray scale voltage is applied to the first electrodes on the first substrate 200, the common voltage is applied to the second electrode 450 on the second substrate 400, and the liquid crystal molecules of the liquid crystal 300 are arranged according to the electric field difference between the first and second electrodes.

The backlight assembly 800 faces the first substrate 200, and generates light that sequentially passes through the first substrate 200, the liquid crystal layer 300 and the second substrate 400. The light passed through the liquid crystal layer 300 is image light 10, and the image light 10 is incident into eyes of the user through the second substrate 400.

When the user works with the light pen 100, the sensing light 142 is applied to the photo detective element 270 disposed between the first electrodes. The light generating module 140 of the light pen 100 generates the sensing light 142 when the photo detective module 120 detects the image light 10.

When the sensing light 142 generated from the light pen 100 is incident into the photo detective elements 270, a second sensing signal is generated from the photo detective elements into which the sensing light 142 is incident. The second sensing signal has position information representing a position to which the sensing light is incident. The sensed signal processing unit 660 transforms the second sensing signal into a digital signal to output position data to the control unit 670.

The control unit 670 receives the position data and output the position data The sensed signal processing unit 660 outputs the position data to the information processor 900. The information processor 900 receives the position data to output new video signals (new RGB signals, etc.) to the control unit 670.

Although the information processor 900 is externally connected to the control unit 670 in FIG. 15, the information processor could also be included in the control unit 670. In other words, the control unit 670 may performs the function of the information processor 900.

Embodiment 2 of a Photo Detective Liquid Crystal Display Device

Figure 16:
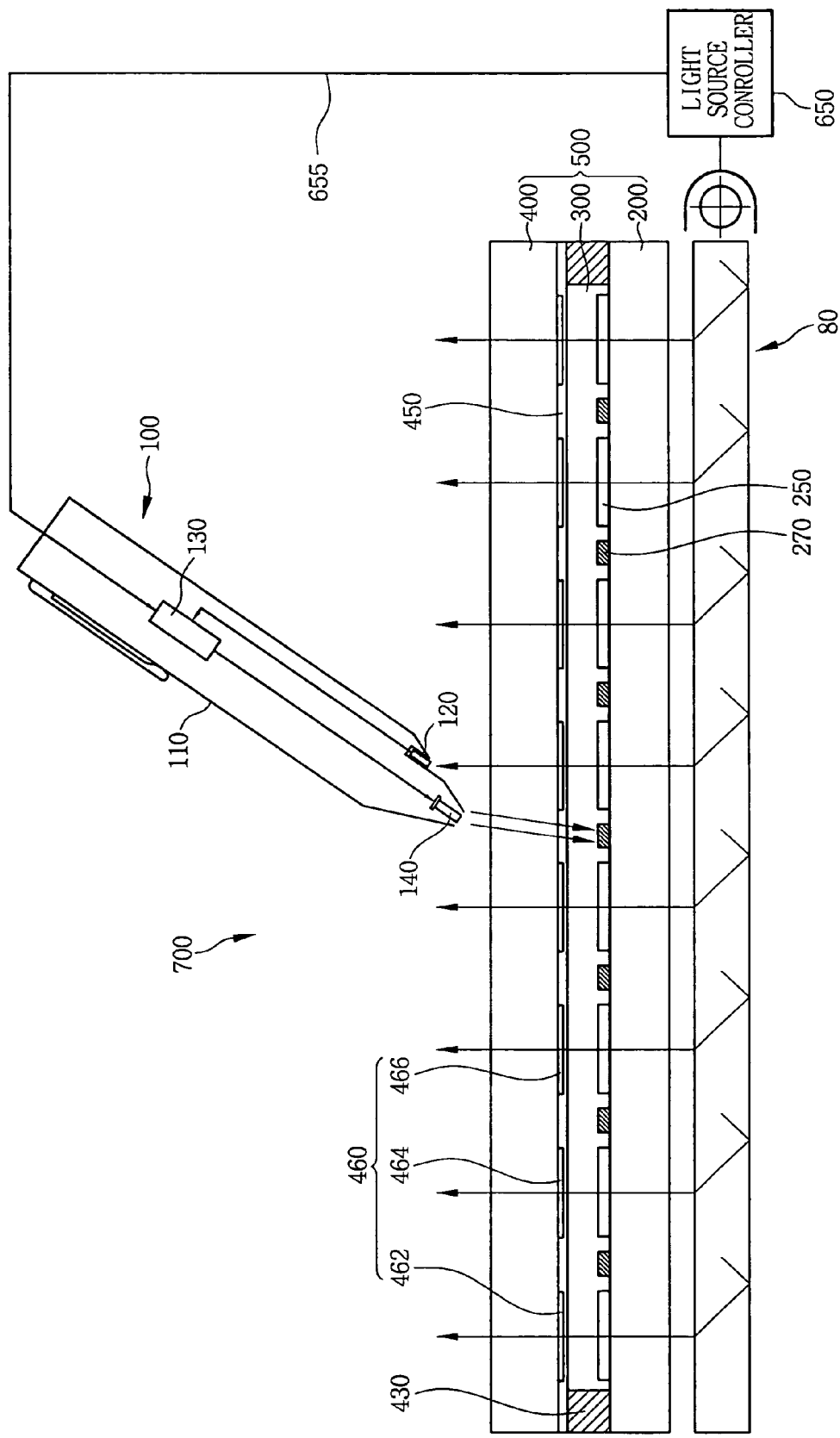
FIG. 16 is a schematic view showing a photo detective liquid crystal display device according to another example of the present invention.

FIG. 16 is a schematic view showing a photo detective liquid crystal display device according to another example of the present invention. In embodiment 2, all descriptions except a method of supplying driving power signal to the light pen are the same as embodiment 1, and will not be further described below to avoid a redundancy.

Referring to FIG. 16, the light source controller 650 of the driving module 600 outputs driving power signal to the light pen 100 through line 655. The line 655 is connected to the control module 130 of the light pen 100, and the control module 130 applies the driving power signal to the light generating module 140.

According to above embodiment, the driving power signal for driving the light pen is coupled with periodic turn-on or turn-off cycle of the light source controller 650 of the driving module 600, so that the number of parts used in the light pen may decrease. In addition, the weight and size of the light pen may be reduced since the light pen does not have the battery or mercury cell for supplying the driving power signal to the light pen.

Embodiment 3 of a Photo Detective Liquid Crystal Display Device

Figure 17:
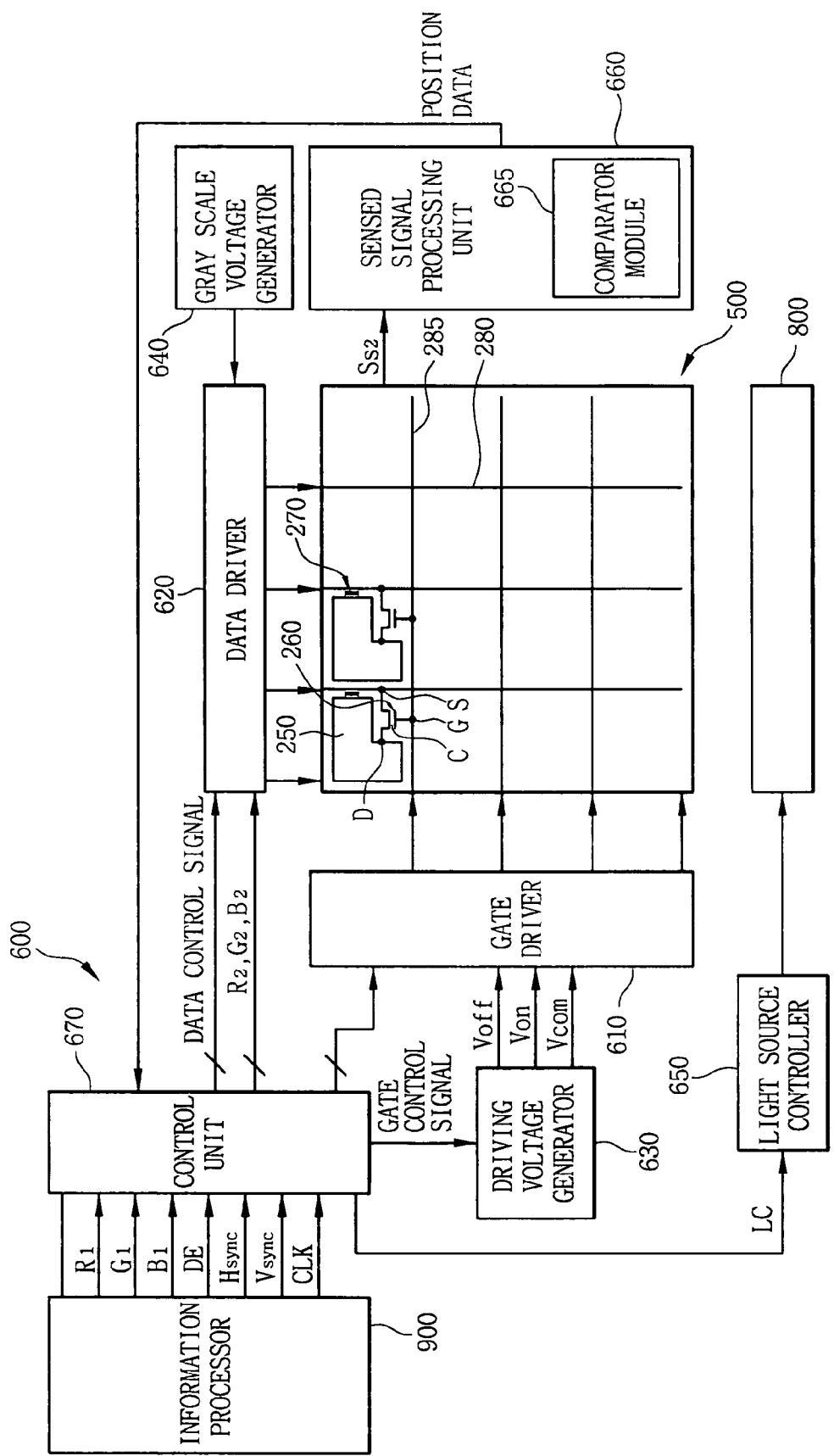
FIG. 17 is a schematic view showing a photo detective liquid crystal display device according to still another example of the present invention.
Figure 18:
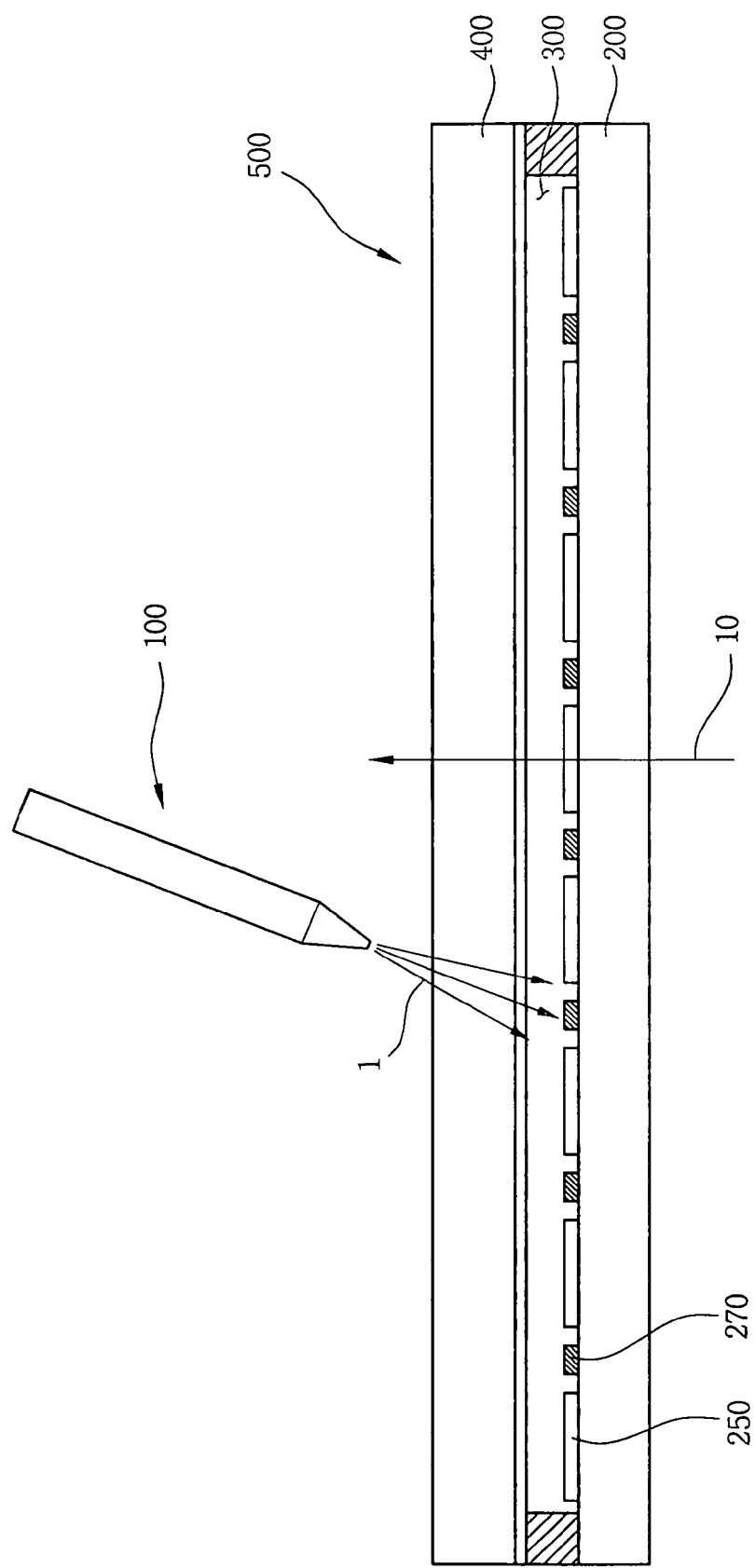
FIG. 18 is a schematic view showing a photo detective liquid crystal display device and a light pen.

FIG. 17 is a schematic view showing a photo detective liquid crystal display device according to still another example of the present invention, and FIG. 18 is a schematic view showing a photo detective liquid crystal display device and a light pen. In embodiment 3, all elements except the comparator module installed in the sensed signal processing unit denote the same elements in embodiment 1, and will not be further described below to avoid a redundancy.

Referring to FIGS. 17 and 18, the sensed signal processing unit 660 receives the second sensing signal outputted from the photo detective element 220.

The sensed signal processing unit 660 further includes the comparator module 665.

The photo detective element 270 is sensitive to light. When the user works with the light pen under an external light such as the sun light or an indoor lightning, the external light is incident into the entire surface of the liquid crystal display panel 500. The photo detective elements 270 outputs an analog sensing signal based on brightness and intensity of illumination of the external light applied to the photo detective elements 270. The analog sensing signal due to the external light may be recognized as the sensing signal generated from the light pen, so that undesired images may be displayed on the liquid crystal display panel. Above abnormal operation of the liquid crystal display device may be shown especially under the sun light because the sun light has strong intensity.

The comparator module 665 compares the intensity and frequency of the sensing signal with those of predetermined reference signals so as to distinguish the external light from the sensing signal generated from the light pen. The abnormal operation of the liquid crystal display device may be reduced by the comparator module 665.

The sensed signal processing unit 660 presets reference light as the sensing signal generated from the light pen. For example, the reference light has a first frequency for a first time period and a second frequency for a second time period.

The first and second time period is short enough so that the user may write letters or draw figures while the user moves the light pen.

Since the light pen has the same configuration as that of embodiment 6 or 7, the light pen will not be described below to avoid a redundancy.

Hereinafter, the operation of the photo detective liquid crystal display device is described.

First, the user presses the light pen 100 to be closely adhered to the surface of the liquid crystal display panel, and the sensing light is generated from the light pen 100. The light pen generates a first sensing light having the first frequency for the first time period and a second sensing light having the second frequency for the second time period. The first frequency is different from the first frequency. The first time period is the same as the second time period, or may be different from the second time period. The first and second frequencies have a frequency except a commercial power frequency such as about 50 Hz or about 60 Hz.

The first and second sensing lights generated from the light pen 100 is applied to the photo detective elements 270 arranged in a matrix shape on the liquid crystal display panel, and the photo detective element 270 outputs an analog signal corresponding to the frequency of the sensing signal to the sensed signal processing unit 660.

The comparator module 665 compares the sensing signal outputted from the photo detective elements 270 with the predetermined reference signals, divides the analog signal generated due to the sensing light outputted from the light pen 100, converts the analog signal into digital signal, and outputs the digital signal to the control unit 670.

The control unit 670 outputs the digital signal to the information processor 900.

The information processor 900 processes the digital signal and outputs new video signals to the control unit 670, so that images are displayed on the liquid crystal display panel.

Embodiment 4 of a Photo Detective Liquid Crystal Display Device

Figure 19:
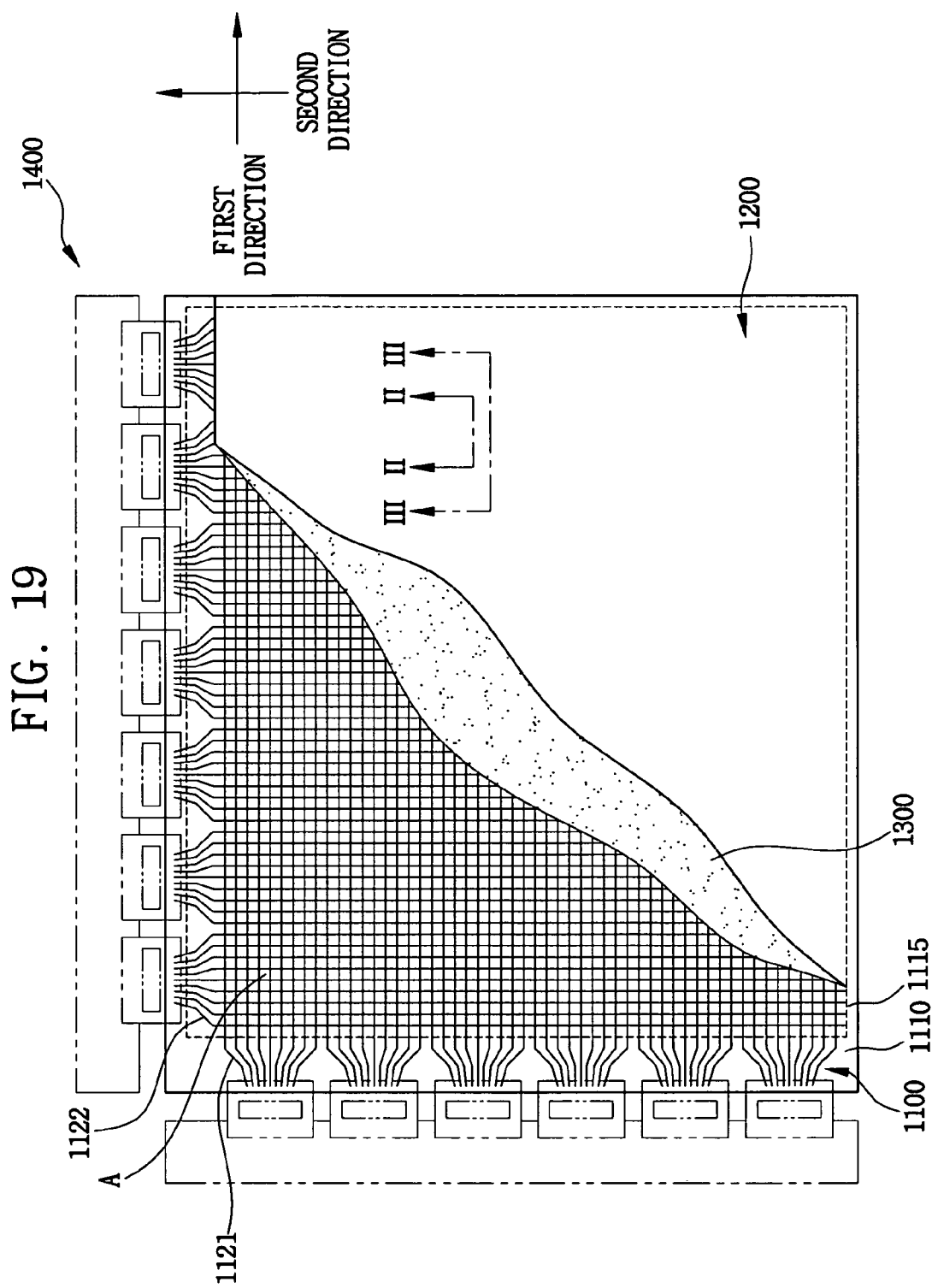
FIG. 19 is a partial cross-sectional perspective view showing a photo detective liquid crystal display device according to one example of the present invention.
Figure 21:
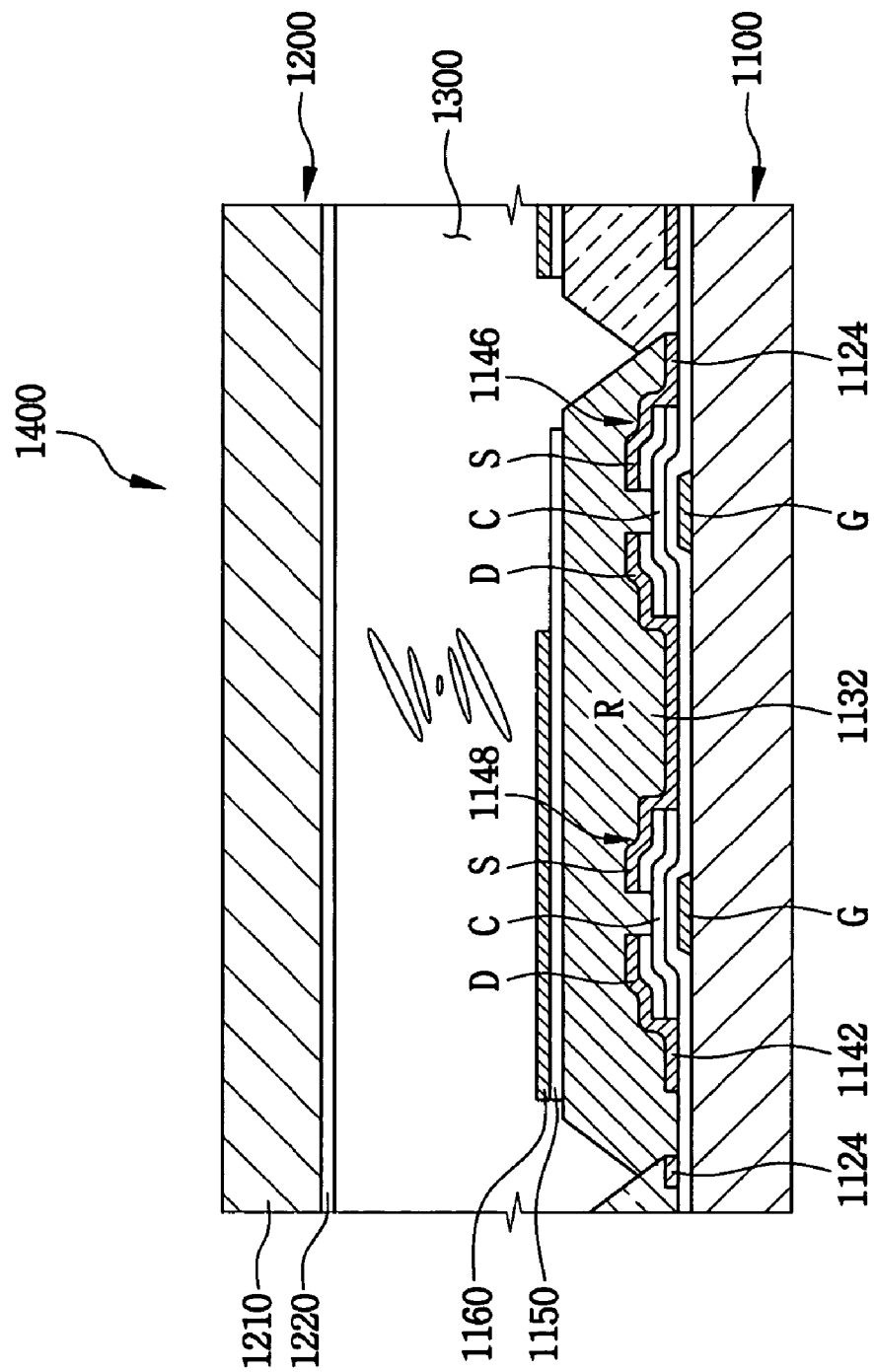
FIG. 21 is a cross-sectional view taken along the line III-III of FIG. 19.

FIG. 19 is a partial cross-sectional perspective view showing a photo detective liquid crystal display device according to one example of the present invention, FIG. 20 is a partially enlarged view showing 'A' of FIG. 19, and FIG. 21 is a cross-sectional view taken along the line III-III of FIG. 19.

Referring to FIGS. 19, 20 and 21, the liquid crystal display panel 1400 includes a first substrate 1100, a second substrate 1200 facing the first substrate 1100, and a liquid crystal layer 1300.

The first substrate 1100 includes a first transparent substrate 1110, a driving voltage applying element 1120, color filters 1130 (refer to FIG. 22), a photo detective part 1140, pixel electrodes 1150 and a black matrix pattern (or light shielding pattern) 1160.

The first transparent substrate 1110 is a glass substrate having a high light transmissivity, and has a plurality of pixels 1101 (refer to FIG. 20). A pixel 1101 is a unit for displaying an image. Hereinafter, a pixel region is referred to as the region in which a plurality of pixels is formed. For example, when the liquid crystal panel has 1024*768 resolution, 1024*768*3 pixels are formed on the first transparent substrate 200. The user recognizes images through the light passing through the pixels 1101.

The driving voltage applying element 1120 includes gate lines 1122, data lines 1124 and first thin film transistors 1123.

The gate lines 1122 are extended in a first direction on the first transparent substrate 1110 to inside pixel 1101. The data lines 1124 are extended in a second direction substantially perpendicular to the first direction on the first transparent substrate 1110 to be formed between pixels 1101.

For example, when the liquid crystal device 1400 has 1024*768 resolution, 768 gate lines are formed on the first transparent substrate 1100, and 1024*3 data lines are formed on the first transparent substrate 1100.

The first thin film transistor 1123 is formed in each of the pixels 1101 on the first transparent substrate 1110. The first thin film transistor 1123 is disposed at the point where the gate line 1122 crosses the data line 1124. The first thin film transistor 1123 includes a gate electrode (G), a channel (C), a source electrode (S) and a drain electrode (D). The gate electrode (G) is extended from the gate line 1122 in the second direction to the pixel 1101. The channel (C) is disposed over the gate electrode (G) and is insulated from the gate electrode (G). The channel (C) comprises amorphous silicon film and $n^+$ amorphous silicon film disposed on the amorphous silicon film. The $n^+$ amorphous silicon film has a first part and a second part. The source electrode (S) is extended from each of the data lines 1124 to the pixel 1101. The source electrode (S) contacts with the first (or second) part of the $n^+$ amorphous silicon film, and the drain electrode (D) contacts with the second (or first) part of the $n^+$ amorphous silicon film.

Figure 22:
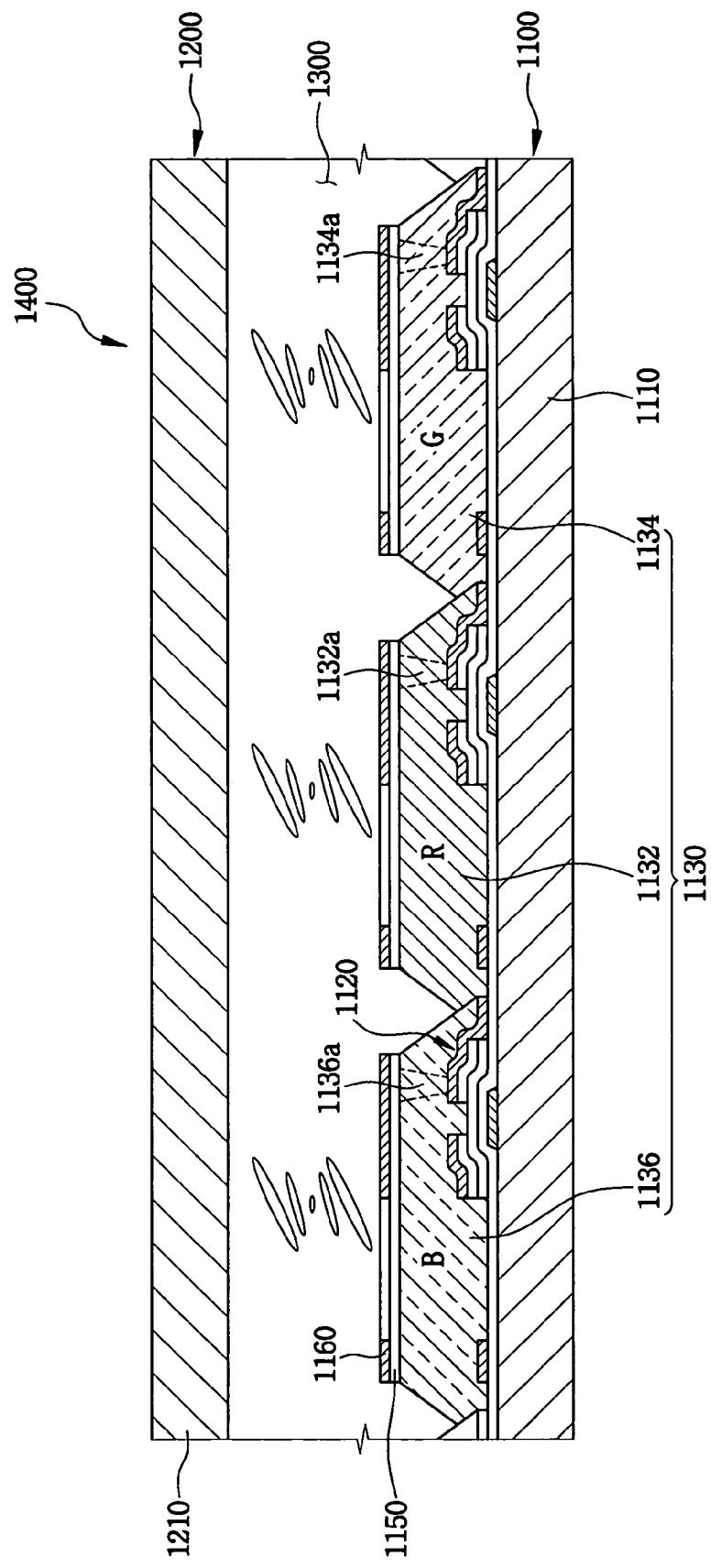
FIG. 22 is a cross-sectional view taken along the line III-III of FIG. 19.

FIG. 22 is a cross-sectional view taken along the line III-III of FIG. 19 so as to show the portion where the photo detective elements are formed.

Referring to FIGS. 20 and 22, the photo detective part 1140 includes a first sensing line 1142, a second sensing line 1144 and photo detective elements 1146 and 1148.

The first sensing line 1142 is formed inside the pixel 1101 along the second direction on the first transparent substrate 1110. The first sensing line 1142 is formed as the same layer as the data line 1124, and is spaced apart from the data line 1124 by a predetermined distance to be electrically insulated from the data line.

The second sensing line 1144 is formed between the pixels 1101 along the first direction on the first transparent substrate 1110. The second sensing line 1144 is formed as the same layer as the gate line 1122, and is spaced apart from the gate line 1122 by a predetermined distance to be electrically insulated from the gate line 1122.

For example, the photo detective elements 1146 and 1148 are formed in selected pixels of all pixels 1101. The photo detective elements 1146 and 1148 output the signal having position information to the first sensing line 1142 in response to the external light applied from outside the liquid crystal display device 1400. The photo detective elements 1146 and 1148 include a second thin film transistor 1146 and a third thin film transistor 1148.

The second thin film transistor 1146 is turned on in response to the external light. The second thin film transistor 1146 includes a gate electrode (G), a channel (C), a source electrode (S) and a drain electrode (D).

The gate electrode (G) is extended from the second sensing line 1144 in the second direction to each of the pixels 1101. The channel (C) is disposed over the gate electrode (G) and is insulated from the gate electrode (G). The channel (C) comprises amorphous silicon film and $n^+$ amorphous silicon film disposed on the amorphous silicon film. The $n^+$ amorphous silicon film has a first part and a second part. The amorphous silicon film and the $n^+$ amorphous silicon film transforms the external light into electric current (or energy) to allow the second thin film transistor to be electrically conducted. The source electrode (S) is extended from the data lines 1124 to the pixel 1101. The source electrode (S) contacts with the first (or second) part of the $n^+$ amorphous silicon film, and the drain electrode (D) contacts with the second (or first) part of the $n^+$ amorphous silicon film. The drain electrode (D) is extended in the direction along which the third thin film transistor 1148 is formed.

The third thin film transistor 1146 includes a gate electrode (G), a channel (C), a source electrode (S) and a drain electrode (D).

The gate electrode (G) is extended from the gate line 1122 in the second direction to each of the pixels 1101. The channel (C) is disposed over the gate electrode (G) and is insulated from the gate electrode (G). For example, the channel (C) comprises amorphous silicon film and $n^+$ amorphous silicon film disposed on the amorphous silicon film. The $n^+$ amorphous silicon film has a first part and a second part. The source electrode (S) contacts with the first (or second) part of the $n^+$ amorphous silicon film, and the drain electrode (D) contacts with the second (or first) part of the $n^+$ amorphous silicon film. The drain electrode (D) is extended from the first sensing line 1142 along the first direction to the pixel 1101.

The channel (C) formed on the second thin film transistor 1146 recognizes the red visible light most sensitively. Therefore, the photo detective elements 1146 and 1148 are formed in selected pixels among the pixels on which the red color filters 1132 are formed so that the photo detective elements 1146 and 1148 may effectively recognize the external light.

Referring to FIGS. 20, 21 and 22, the red, green or blue color filter 1130 is disposed in each of the pixels 1101. Edges of the red, green and blue color filters overlap each other so as to shield the light leaking between the pixels. Therefore, the black matrix pattern is not necessarily required so as to shield the light leaking between the pixels.

The color filters 1130 include a red color filter 1132, a green color filter 1134 and a blue color filter 1136. The red color filter 1132 passes light having wavelength corresponding to the red visible light, the green color filter 1134 passes light having wavelength corresponding to the green visible light, and the blue color filter 1136 passes light having wavelength corresponding to the blue visible light.

For example, n(n is natural number)th pixel includes the red color filter 1132, (n+1)th pixel includes the green color filter 1134, and (n+2)th pixel includes the blue color filter 1136. The color filters 1130 cover the entire surface of the pixels 1101. Each of the color filters 1130 includes contact holes 1132a, 1134a and 1136a, and the contact holes 1132a, 1134a and 1136a are formed over the drain electrode (D) of the thin film transistor 1120.

The pixel electrodes 1150 are formed in the pixel region and are disposed over the color filters 1130. The pixel electrodes 1150 comprise ITO or IZO. The pixel electrodes 1150 are electrically connected to the drain electrode (D) of the thin film transistor 1120 through the contact holes 1132a, 1134a and 1136a formed on the color filters 1130. The pixel electrodes 1150 receives the driving power signal from the first thin film transistor 1120.

The black matrix pattern 1160 is formed on the pixel electrodes 1150. The black matrix pattern 1160 is electrically connected to the drain electrode (D) of the first thin film transistor 1123 through the contact holes 1132a, 1134a and 1136a formed on the color filters 1130. The black matrix pattern 1160 comprises aluminum neodymium (Al-Nd) having high reflectivity. The black matrix 1160 covers the driving voltage generator 1120, the first sensing line 1142, the second sensing line 1144 and the third thin film transistor 1148. The black matrix 1160 shields the light leaking between the first and the second substrates 1100 and 1200, and prevents the first and third thin film transistors 1123 and 1148 from being exposed to the external light. In addition, the black matrix pattern 1160 has openings that is disposed over the second thin film transistor 1146, and passes the light incident into the pixels 1101 through the opening, so that the light supplied from the light pen may be applied to the second thin film transistor 1146.

Referring to FIGS. 21 and 22, the second substrate 1200 further includes a second transparent substrate 1210 and a common electrode 1220. The common electrode 1220 is formed on entire surface of the second transparent substrate 1210 and comprises ITO or IZO.

The first and second substrates 1100 and 1200 are combined with each other so that the pixel electrodes 1150 face the common electrode 1220. A sealing member 1115 (refer to FIG. 19) is formed in the peripheral portion of the first and second substrates 200 and 400 to have a band shape so as to combine the first and second substrates 1100 and 1200.

The liquid crystal layer 1300 is interposed between the first and second substrate 1100 and 1200. The liquid crystal molecules of the liquid crystal layer 1300 is arranged according to the electric field formed between the pixel electrodes 1150 and the common electrode 1220.

According to above embodiment, the driving voltage generator 1120, the color filters 1130, the photo detective part 1140, the pixel electrodes 1150 and the black matrix pattern (or light shielding pattern) 1160 are formed on the first substrate 1100, and only the common electrode 1220 is formed the second substrate 1200. Therefore, the first and second substrates 1100 and 1200 are easily assembled each other and the reliability of the liquid crystal display device is enhanced because the mis-align between the first and second substrates 1100 and 1200 is reduced. In addition, since the distance between the gate lines 1122, data lines 1124 and the pixel electrodes 1150 increases due to the color filters 1130 formed on the pixels 1101, and the area of the opening increases. Therefore, the resolution of the display device is enhanced compared with the conventional display device using the touch panel.

In addition, the photo detective part 1140 for providing position information is formed in the liquid crystal display device 1400, so that the liquid crystal display device has enhanced optical properties, thinner thickness and reduced manufacturing cost compared with the conventional display device using the touch panel. In addition, the photo detective part 1140 is formed only on the pixels 1101 in which the red color filters 1132 are formed, so that the photo detective part of the display device may recognizes the light generated from the light pen effectively.

Embodiment 5 of a Photo Detective Liquid Crystal Display Device

Figure 23:
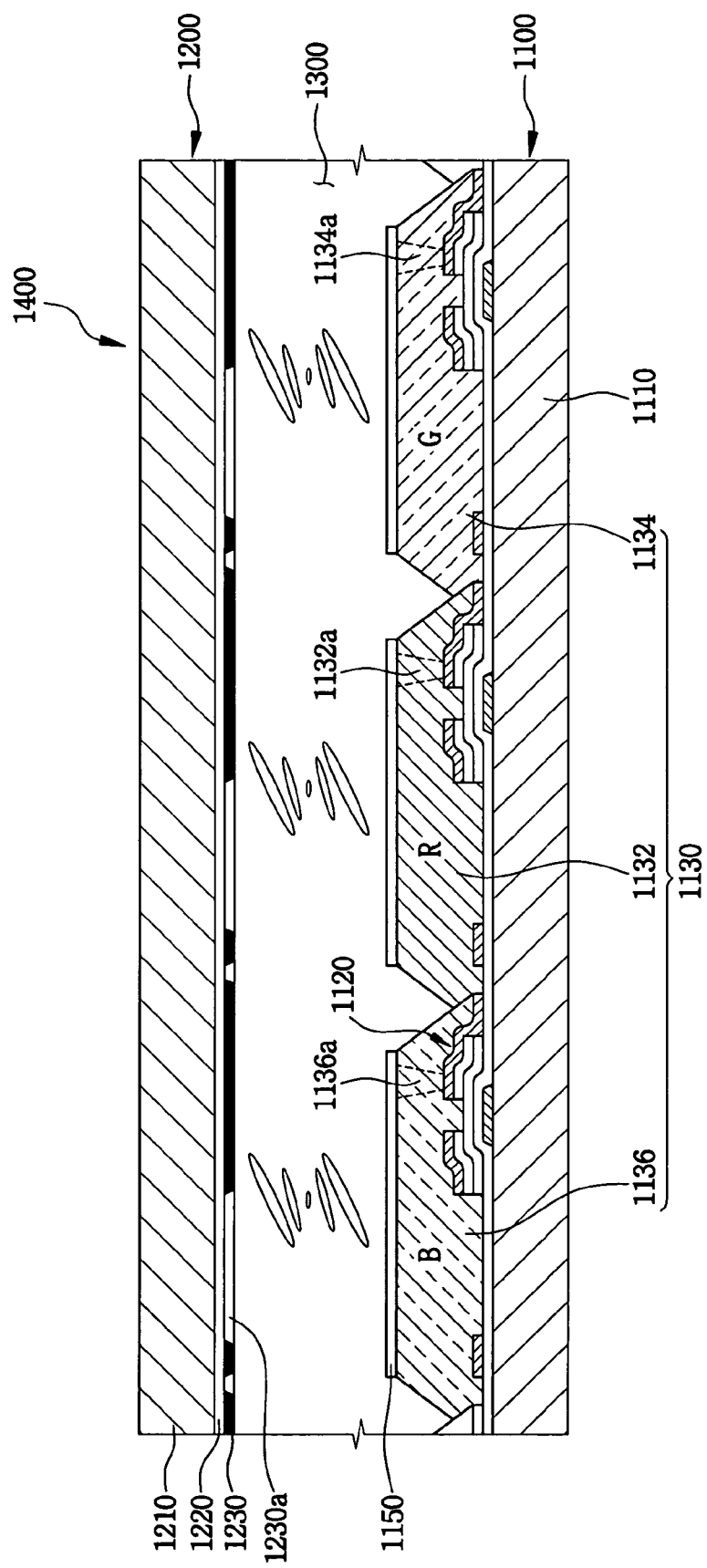
FIG. 23 is a cross-sectional view showing pixel regions of the photo detective liquid crystal display device according to one exemplary embodiment of the present invention.
Figure 24:
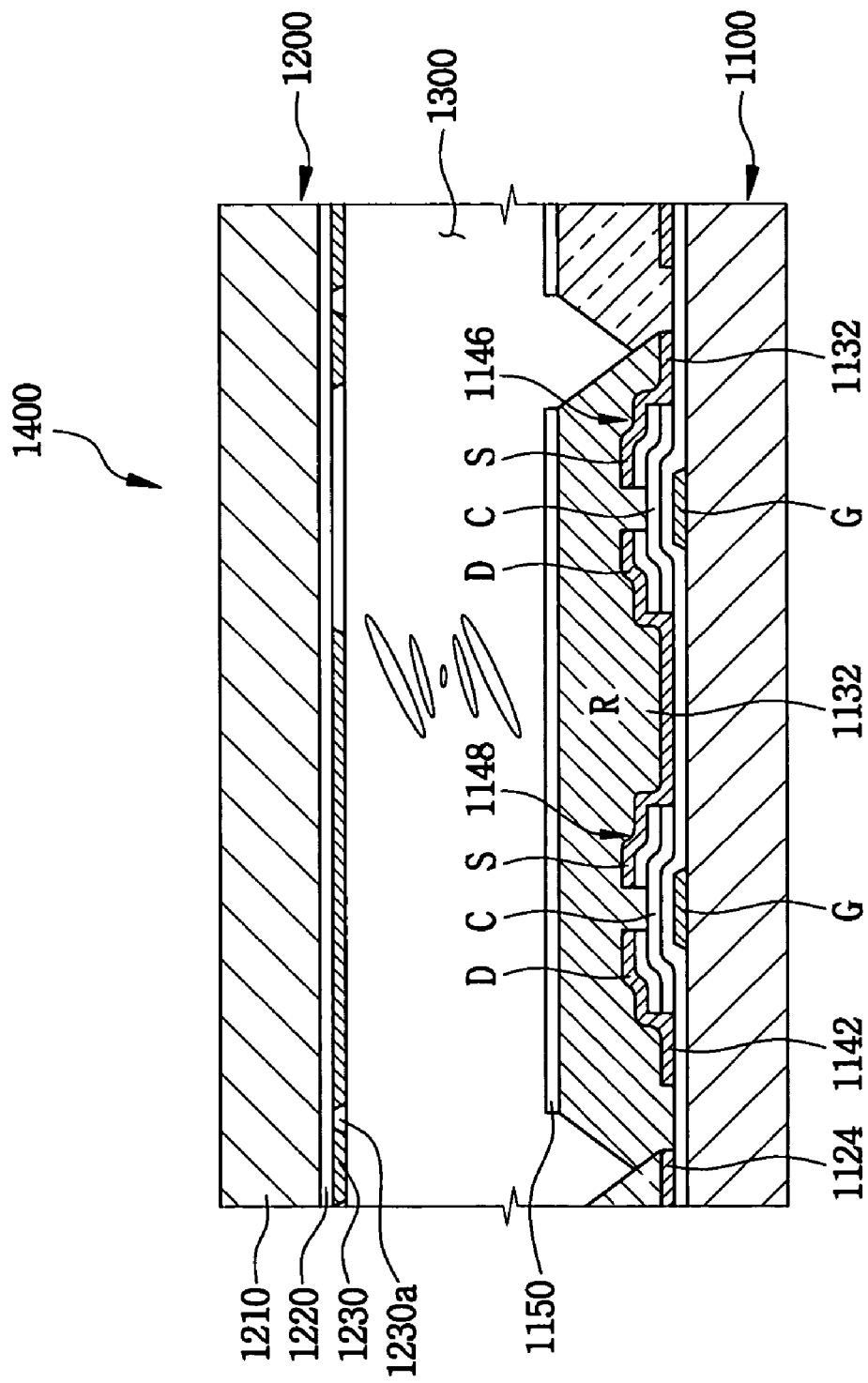
FIG. 24 is a cross-sectional view showing photo detective element of the photo detective liquid crystal display device according to one exemplary embodiment of the present invention.

FIG. 23 is a cross-sectional view showing pixel region of the photo detective liquid crystal display device according to one exemplary embodiment of the present invention, and FIG. 24 is a cross-sectional view showing photo detective element of the photo detective liquid crystal display device according to one exemplary embodiment of the present invention. In embodiment 5, all descriptions except that the black matrix pattern is formed on the second substrate are the same as embodiment 4, and will not be further described below to avoid a redundancy.

Referring to FIGS. 23 and 24, the second substrate 1200 further includes a black matrix pattern 1230. For example, the black matrix pattern 1230 is formed on the common electrode 1220 in a matrix shape.

The black matrix pattern 1230 is formed by patterning black matrix thin film comprising organic material that has light transmittance or light shielding ratio similar to chromium (Cr). In other words, the black matrix thin film transmits light and shields light in the similar degree (or ratio) to the chromium (Cr). Particularly, the black matrix pattern 1230 comprises black organic material that has light transmittance or light shielding ratio similar to chromium (Cr).

The black matrix 1230 covers the driving voltage generator 1120, the first sensing line 1142, the second sensing line 1144 and the third thin film transistor 1148. The black matrix 1230 shields the light that leaks between the first and the second substrates 1100 and 1200 through the driving voltage generator 1120, the first and second sensing line 1142 and 1144 and the third thin film transistor 1148. The black matrix 1230 prevents the first and third thin film transistors 1123 and 1148 from being exposed to the external light. In addition, the black matrix pattern 1160 has openings 1230a that are disposed over the second thin film transistor 1146, and passes the light incident into the pixels 1101 through the openings 1230a, so that the light supplied from the light pen may be applied to the second thin film transistor 1146.

The black matrix pattern 1230 passes the light incident into the pixels 1101 through the opening 1230a, and shields the light passing between the pixels 1101.

The black matrix pattern 1230 completely shields the light passing the overlapped color filters 1130, so that the display quality is enhanced.

For example, a twisted nematic liquid crystal (TN LC) or a vertical alignment mode liquid crystal (VA LC) is disposed between the first substrate 1100 and the second substrate 1200 on which the black matrix pattern 1230 is formed.

According to above embodiment, the black matrix pattern is formed on the common electrode of the second substrate, so that the light passing between the pixels is completely shielded and the display quality is enhanced.

Although above preferred embodiments discuss the liquid crystal display device, the organic electroluminescence device could be utilized.

According to the present invention, the light pen detects image light generated from the surface of the display device, and generates sensing light by means of the light source mounted in the light pen. Therefore, the power consumption of the light pen is greatly reduced, and the brightness of the sensing light is greatly enhanced. The light pen generates light different from the external light such as sun light, etc., and the display device recognizes the light generated from the light pen effectively. Therefore, the display device may operate without failure.

Having described the exemplary embodiments of the present invention and its advantages, it is noted that various changes, substitutions and alterations can be made herein without departing from the spirit and scope of the invention as defined by appended claims.

What is claimed is:

1. A light pen comprising:
   a body;
   a driving pulse generating module that is configured to generate a first driving power pulse having a first frequency during a first time period and a second driving power pulse having a second frequency during a second time period, the driving pulse generating module being disposed in the body; and a light generating module that is configured to generate a first light in response to the first driving power pulse and a second light in response to the second driving power pulse, the first light flickering at a third frequency, and the second light flickering at a fourth frequency.

2. The light pen of claim 1, wherein the first and second frequencies respectively have a frequency except a commercial power frequency.

3. The light pen of claim 1, wherein the driving pulse generating module generates alternately the first driving power pulse and the second driving power pulse.

4. The light pen of claim 1, wherein the light generating module includes a light emitting diode or a semiconductor laser beam generator.

* * * * *